US009475384B2

United States Patent
Matsuura et al.

(10) Patent No.: US 9,475,384 B2
(45) Date of Patent: Oct. 25, 2016

(54) POWERTRAIN SYSTEM FOR VEHICLE

(71) Applicant: KANZAKI KOKYUKOKI MFG. CO., LTD., Amagasaki-shi (JP)

(72) Inventors: Jun Matsuura, Amagasaki (JP); Koji Iwaki, Amagasaki (JP); Tomoyuki Ebihara, Amagasaki (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 0 days.

(21) Appl. No.: 14/482,865

(22) Filed: Sep. 10, 2014

(65) Prior Publication Data
US 2015/0068824 A1 Mar. 12, 2015

(30) Foreign Application Priority Data

Sep. 11, 2013 (JP) .................................. 2013-188245

(51) Int. Cl.
| | | |
|---|---|---|
| *B60K 17/10* | (2006.01) | |
| *B60K 17/28* | (2006.01) | |
| *F16H 47/02* | (2006.01) | |
| *B60K 5/04* | (2006.01) | |

(52) U.S. Cl.
CPC .............. *B60K 17/105* (2013.01); *B60K 5/04* (2013.01); *B60K 17/28* (2013.01); *F16H 47/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,918,850 B2* | 7/2005 | Hasegawa | ................ | B60K 5/00 475/72 |
| 7,303,498 B2* | 12/2007 | Ishii | ...................... | B60K 17/28 475/72 |
| 8,758,195 B2* | 6/2014 | Iwaki | .................... | B60W 10/10 477/52 |
| 8,806,864 B2* | 8/2014 | Ishii | ....................... | F16H 47/02 60/487 |
| 9,103,359 B2* | 8/2015 | Mochizuki | .............. | F15B 21/00 |
| 9,248,737 B2* | 2/2016 | Iwaki | ..................... | B60K 17/04 |
| 2005/0230171 A1* | 10/2005 | Hasegawa | ............ | B60K 17/105 180/242 |
| 2009/0095102 A1* | 4/2009 | Koga | .................. | F16H 61/0213 74/336 R |
| 2014/0060953 A1 | 3/2014 | Wetterlund | | |
| 2015/0306954 A1* | 10/2015 | Matsuura | ........... | B60K 17/3462 180/233 |

FOREIGN PATENT DOCUMENTS

JP 2006-256510 A 9/2006

* cited by examiner

*Primary Examiner* — Nicole Verley
(74) *Attorney, Agent, or Firm* — Sterne, Kessler, Goldstein & Fox P.L.L.C.

(57) ABSTRACT

A powertrain system for driving a vehicle comprises an engine, a transaxle including a hydraulic motor, a hydraulic pump separated from the hydraulic motor, and a gearbox joined to the hydraulic pump. The engine includes an engine output shaft extended in the lateral direction of the vehicle. The hydraulic pump and the hydraulic motor are fluidly connected to each other so as to constitute a hydrostatic transmission. The gearbox supports a PTO shaft. The gearbox incorporates gears for drivingly connecting the engine output shaft to the hydraulic pump, and for drivingly connecting the engine output shaft to the PTO shaft extended in the fore-and-aft direction of the vehicle.

6 Claims, 15 Drawing Sheets

POWERTRAIN SYSTEM FOR VEHICLE

BACKGROUND OF THE INVENTION

1. Field of the Invention

The present invention relates to a powertrain system for a vehicle, the power train system including a lateral engine, a hydrostatic transmission (hereinafter referred to as "HST"), and a transaxle, the HST including a hydraulic pump and hydraulic motor separated from each other, and the transaxle including the hydraulic motor.

2. Related Art

As disclosed by JP 2006-256510 A, there is a well-known conventional working vehicle, such as a utility vehicle, equipped with a powertrain system including an engine, an HST and a transaxle. The engine is a lateral engine having a lateral engine output shaft (extended in the lateral direction of the vehicle). The HST includes a hydraulic pump and a hydraulic motor fluidly connected to each other via pipes, however, the hydraulic pump is coupled to the engine, and the hydraulic motor is coupled to a transaxle housing of the transaxle, so that the hydraulic pump and the hydraulic motor are separated from each other. The hydraulic pump includes a lateral pump shaft connected coaxially to the engine output shaft, and the hydraulic motor includes a lateral motor shaft connected coaxially to a lateral rotary shaft in the transaxle housing.

The lateral engine is advantageous to minimize the powertrain system in the fore-and-aft direction of the vehicle. The hydraulic motor separated from the hydraulic pump is advantageous to minimize the transaxle including the hydraulic motor. The pipes interposed between the hydraulic pump and the hydraulic motor are flexible so as to increase flexibility in arrangement of the transaxle relative to the engine and in arrangement of other components of the vehicle. Further, such a flexibility in arrangement of components in the vehicle contributes to improvement of steering performance of the vehicle.

However, any portion of the powertrain system between the engine and axles driven by the transaxle may need change in design if either a gasoline engine or a diesel engine should be selected to serve as the engine of the powertrain system, if the vehicle needs to be equipped with an unexpected additional working implement, e.g., a grass mower, or in other cases. The selection of either the gasoline engine or the diesel engine may need selection of whether or not an additional transmission should be assembled in any portion of the powertrain system. If the vehicle needs to be equipped with the additional working implement, an additional power take off (hereinafter referred to as "PTO") shaft should be arranged in any portion of the powertrain system. The transaxle is mostly required to have a change of design (for example, change of gears in the transaxle casing) to correspond to these cases. Therefore, such a change of design is likely to be drastic so as to increase costs.

Further, in the situation where some latent cases requiring change of design exist, the transaxle (without the hydraulic motor), the hydraulic pump and the hydraulic motor are hindered from being standardized for simplifying and economizing their inventory control and for facilitating their maintenance.

BRIEF SUMMARY OF THE INVENTION

An object of the invention is to provide a powertrain system for a vehicle, wherein the powertrain system can be easily and economically changed in design so as to correspond to various requirements.

To achieve the object, a powertrain system for a vehicle comprises an engine, a transaxle including a hydraulic motor, a hydraulic pump separated from the hydraulic motor, and a gearbox joined to the hydraulic pump. The engine includes an engine output shaft extended in the lateral direction of the vehicle. The hydraulic pump and the hydraulic motor are fluidly connected to each other so as to constitute an HST. The gearbox supports a PTO shaft. The gearbox incorporates gears for drivingly connecting the engine output shaft to the hydraulic pump, and for drivingly connecting the engine output shaft to the PTO shaft extended in the fore-and-aft direction of the vehicle.

Therefore, the gearbox and the gears in the gearbox only need change of design or exchange for another designed gearbox even if various designs for the powertrain system are supposed due to whether the engine is a gasoline engine or a diesel engine, whether or not the powertrain system needs a PTO shaft for driving a working implement, or so on. In other words, the transaxle, the hydraulic pump and the hydraulic motor can be kept regardless of the change in design of the gearbox and gears in the gearbox.

Preferably, a PTO clutch is disposed in the gearbox so as to be interposed between the engine output shaft and the PTO shaft.

Therefore, the powertrain system needs no additional housing for the PTO clutch outside of the gearbox, no support member disposed outside of the gearbox to r support an additional housing for the PTO shaft, and no space outside of the gearbox to arrange an additional housing for the PTO shaft, thereby being minimized.

Further preferably, the PTO clutch is a hydraulic clutch, and an accumulator for fluid supplied to the PTO clutch is disposed in the gearbox.

Therefore, the accumulator absorbs a surplus of fluid supplied to the PTO clutch so as to reduce a shock when the PTO clutch is switched.

Preferably, the powertrain system includes a charge pump for supplying fluid to the HST. A drive shaft for driving the charge pump is extended coaxially to a pump shaft of the hydraulic pump of the HST extended perpendicular to the engine output shaft.

Therefore, the charge pump can be disposed in the gearbox or in the outside of the gearbox opposite the hydraulic pump of the HST, thereby minimizing the powertrain system in the lateral direction of the vehicle (in the axial direction of the engine output shaft). Further, the powertrain system needs no additional support member for supporting the charge pump, thereby reducing costs.

These, further and other objects, features and advantages of the invention will appear more fully in the following description with reference to the attached drawings.

BRIEF DESCRIPTION OF THE DRAWINGS/FIGURES

DETAILED DESCRIPTION OF THE INVENTION

Embodiments about a working vehicle 1 (hereinafter, simply referred to as "vehicle 1"), e.g., a utility vehicle, and a powertrain system for vehicle will be described on an assumption that arrows F in some drawings, e.g., FIG. 1, designate the forward direction of vehicle 1. In this regard, directions and positions of respective members and portions in vehicle 1 will be defined in the fore-and-aft direction of vehicle 1 and in the lateral direction of vehicle 1 on the assumption that vehicle 1 is directed forward in the direction designated by arrow F, however, any modification of direction and position is adaptable to each member or portion as far as possible and unless such modification of direction or position deviates from the scopes of later-mentioned claims. Further, in the schematic diagrams such as FIG. 1, the definition of members and portions in direction and position based on the direction of arrow F should be ordinary. For example, in FIG. 1, arrow F may be used to define a rough layout of components 2, 3, 4 and 5 and to define whether each of shafts in these components is extended in the fore-and-aft direction of vehicle 1 or in the lateral direction of vehicle 1, however, a controller 75 should not be defined as being disposed forward from these components.

Figure 1:
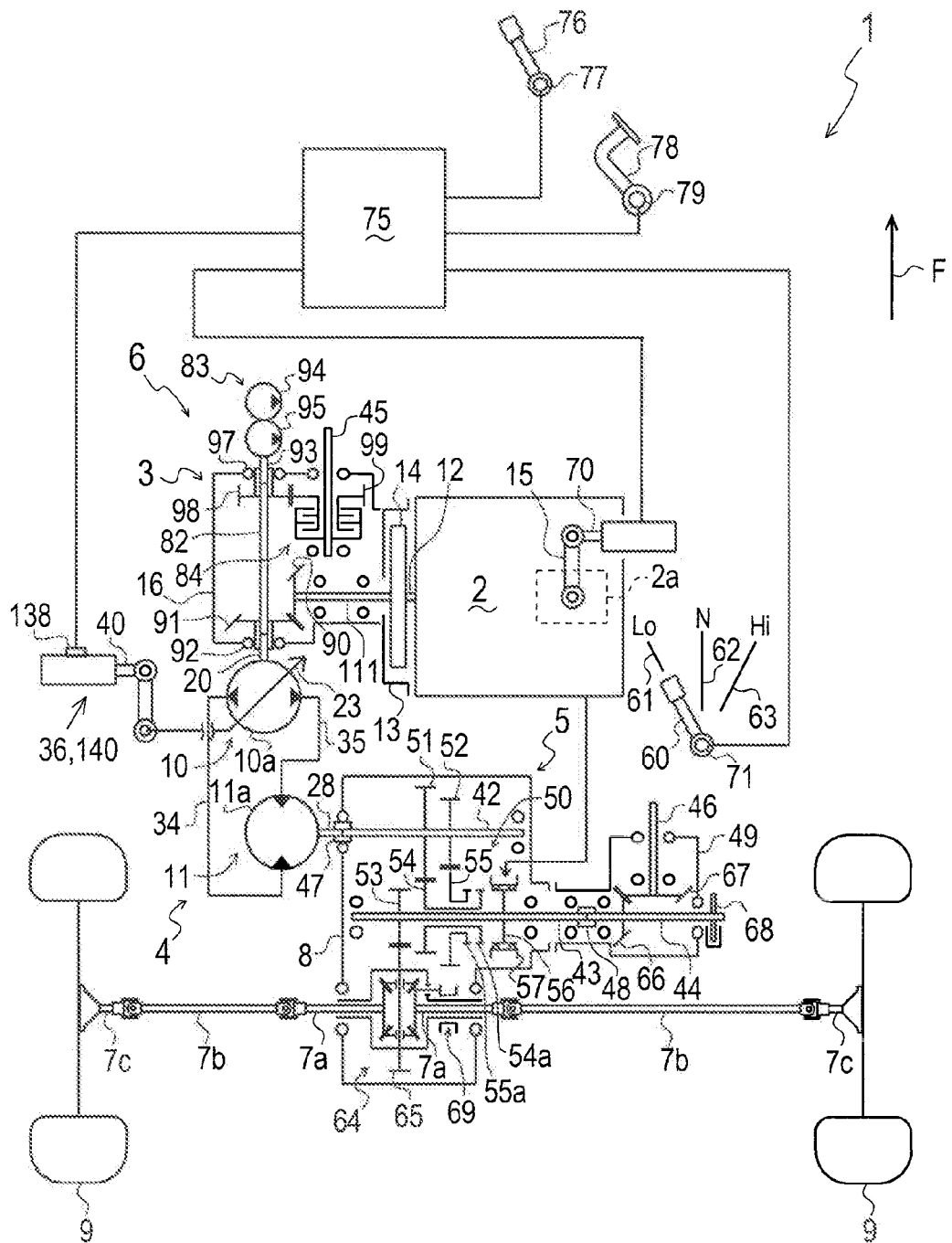
FIG. 1 is a skeleton diagram of a powertrain system for a vehicle.
Figure 2:
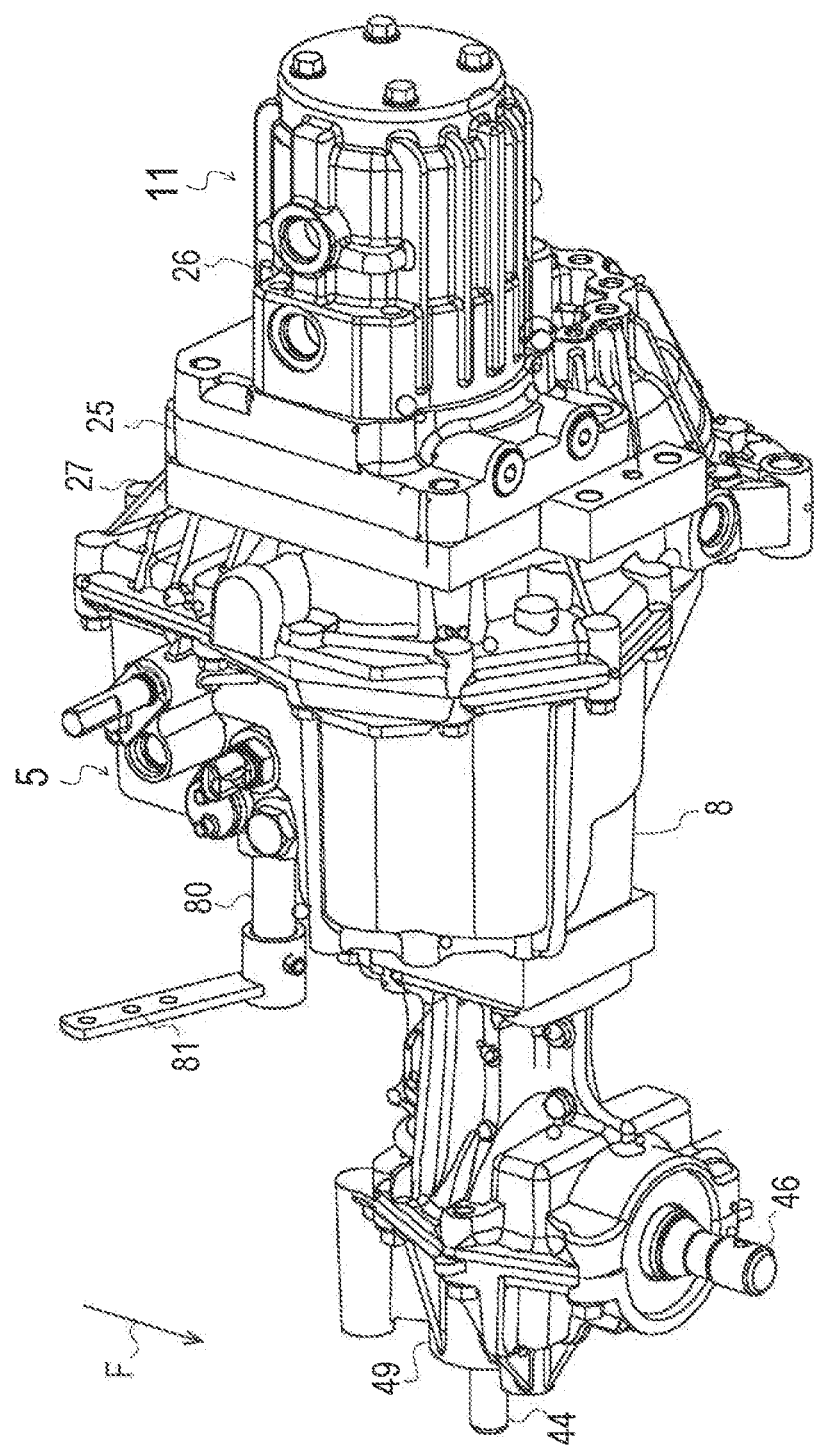
FIG. 2 is a perspective view of a transaxle for the powertrain system.
Figure 3:
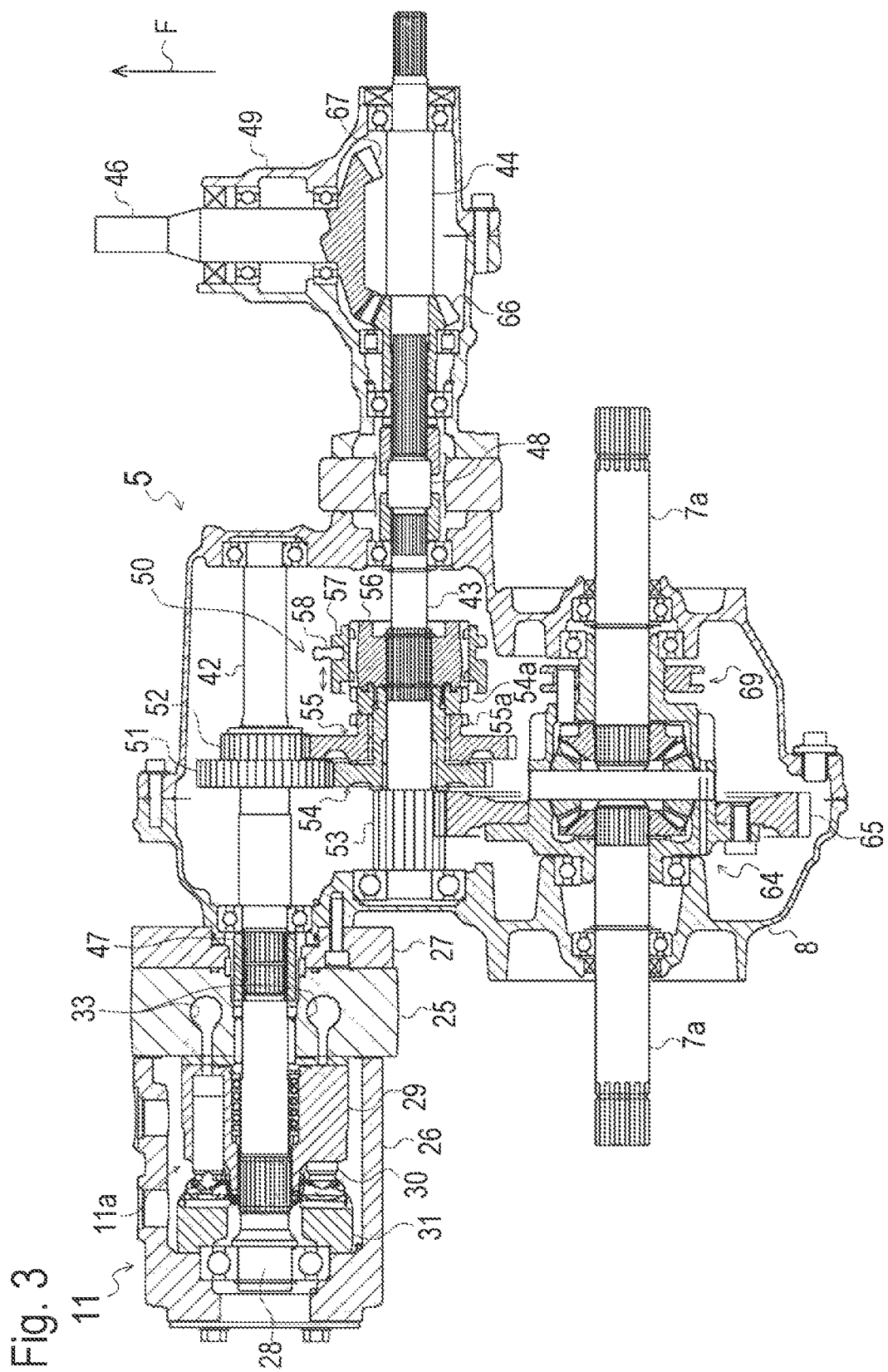
FIG. 3 is a sectional plan view of the transaxle.

Referring to FIGS. 1 to 3, vehicle 1 is equipped with right and left drive wheels 9 having respective axles 7c, and is equipped with a transaxle 5 having right and left differential output shafts 7a drivingly connected to respective axles 7c of right and left drive wheels 9 via respective constant velocity universal joints 7b. Transaxle 5 includes a transaxle housing 8 incorporating a differential gear unit 64 supporting right and left differential output shafts 7a, and incorporating transmission gears for driving the differential gear unit 64. Transaxle 5 also includes a hydraulic motor 11 for driving the transmission gears. Hydraulic motor 11 is mounted on transaxle housing 8 so that hydraulic motor 11 is extended leftward from a left end of transaxle housing 8 in this embodiment.

Figure 4:
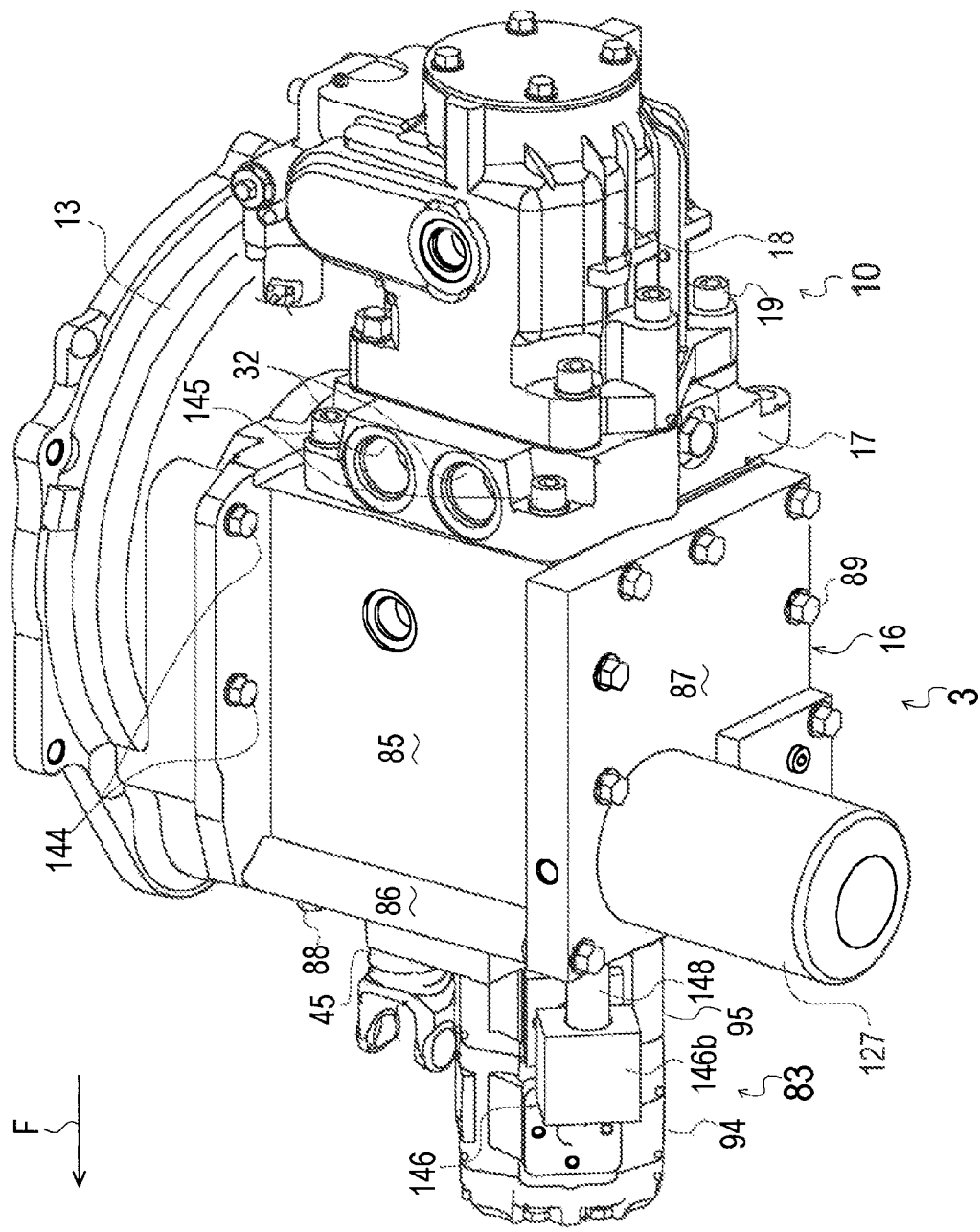
FIG. 4 is a perspective view of a gear unit for the powertrain system.
Figure 5:
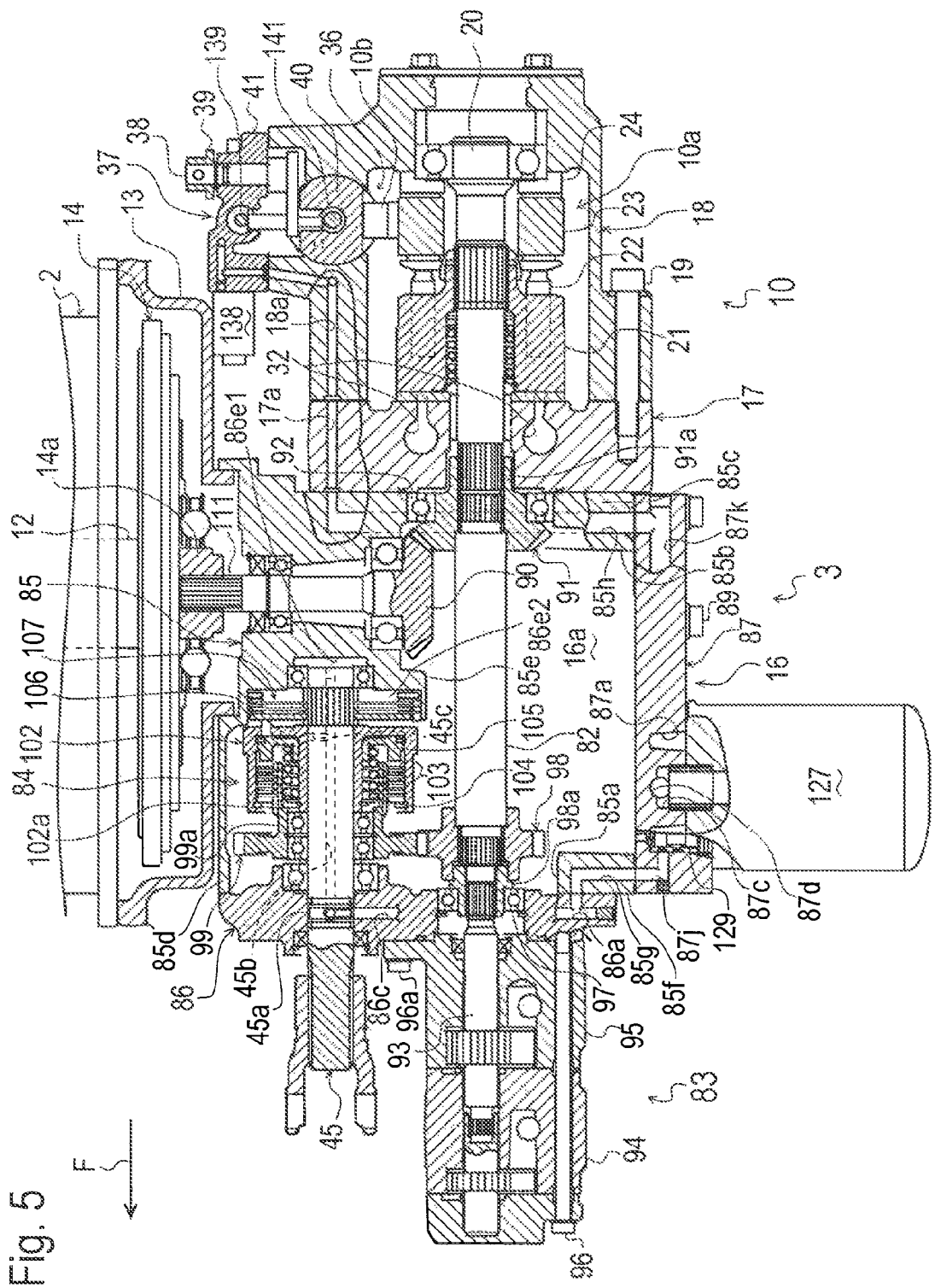
FIG. 5 is a sectional plan view of the gear unit.

Referring to FIGS. 1, 4 and 5, vehicle 1 is equipped with an engine 2 and a gear unit 2 aligned in the lateral direction of vehicle 1. In this embodiment, gear unit 3 is extended leftward from engine 2. Engine 2 and gear unit 3 are disposed forward or rearward from transaxle 5. In this embodiment, right and left drive wheels 9 serve as rear wheels of vehicle 1, and engine 2 and gear unit 3 are disposed forward from transaxle 5. Gear unit 3 includes a gearbox 16 incorporating gears and a clutch. A hydraulic pump 10 for supplying fluid to hydraulic motor 11 is mounted on gearbox 16 so that hydraulic pump 10 is extended rearward from a rear end of gearbox 16 in this embodiment.

Hydraulic pump 10 attached to gearbox 16 of gear unit 3 and hydraulic motor 11 attached to transaxle housing 8 of transaxle 5 are fluidly connected to each other so as to constitute a hydrostatic stepless transmission 4 (hereinafter referred to as "HST 4"). Gear unit 3, HST 4 and transaxle 5 constitute a vehicle driving powertrain system 6 for transmitting power of engine 2 to differential output shafts 7a and later-discussed PTO shafts 45 and 46.

Referring to FIGS. 1, 4 and 5, engine 2 includes an engine output shaft 12 having a lateral axis parallel to differential output shafts 7a. In this embodiment, engine output shaft 12 extends leftward so as to be joined to a flywheel 14 in a flywheel housing 13 fixed to a left end of engine 2. Engine 2 also includes a throttle 2a and an engine control lever 15 for controlling an opening of throttle 2a. Vehicle 1 is equipped with an actuator (in this embodiment, a piston) 70 for controlling engine control lever 15. Vehicle 1 is equipped with an accelerator pedal 78 serving as a main speed control manipulator of vehicle 1. Vehicle 1 includes a controller 75 that receives a detection signal from a position sensor 79 detecting an operational position (depression degree) of accelerator pedal 78, and that commands actuator 70 for controlling throttle 2a of engine 2 and/or a later-discussed proportional solenoid valve 138 for controlling a tilt angle of a movable swash plate 23 of hydraulic pump 10 of HST 4 so as to realize a traveling speed of vehicle 1 corresponding to the operational position (depression degree) of accelerator pedal 78.

Referring to FIGS. 1, 4 and 5, hydraulic pump 10 of HST 4 includes a main pump assembly 10a and is provided with a duct plate 17, a pump housing 18 and a pump shaft 20. Duct plate 17 is fixed onto a rear end surface of gearbox 16 via bolts 145. Pump housing 18 is fixed onto duct plate 17 via bolts 19 so that pump housing 18 is extended rearward from duct plate 17 so as to incorporate main pump assembly 10a mounted on duct plate 17. Main pump assembly 10a includes a cylinder block 21, axial plungers 22 reciprocally slidably fitted into cylinder block 21, and a movable swash plate 23 pressed against heads of plungers 22 projecting from cylinder block 21. Cylinder block 21 is slidably rotatably fitted to duct plate 17. Cylinder block 21 is fixed on pump shaft 20 so that pump shaft 20 serves as a rotary axis of cylinder block 21.

A front end portion of pump shaft 20 is journalled by duct plate 17 via a bearing, and is spline-fitted into a boss portion 91a of a later-discussed bevel gear 91. A rear end portion of pump shaft 20 is journalled by a rear end portion of pump housing 18 via a bearing. In pump housing 18, a swash plate guide 24 is mounted to the rear end portion of pump housing 18, and cradle-type swash plate 23 is slidably fitted to swash plate guide 24, so that swash plate 23 is rotatable to decide the direction and quantity of flow of fluid delivered from hydraulic pump 10.

Hydraulic pump 10, including pump assembly 10a, duct plate 17, pump housing 18 and pump shaft 20, can be detached from gearbox 16 of gear unit 3 by loosening bolts 145 and separating duct plate 17 from the rear end surface of gearbox 16. In this regard, the front end portion of pump shaft 20 spline-fitted in bevel gear 91 can be easily released from boss portion 91a of bevel gear 91 so as to facilitate the detachment of hydraulic pump 10 from gearbox 16.

Referring to FIGS. 1, 2 and 3, hydraulic motor 11 of HST 4 includes a main motor assembly 11a and is provided with a duct plate 25, a motor housing 26 and a motor shall 28. In this regard, a motor mount plate 27 is fixed to a left end surface of a front portion of transaxle housing 8. Duct plate 25 is fitted onto a left end surface of motor mount plate 27, and motor housing 26 is fastened together with duct plate 25 to motor mount plate 27 via bolts (not shown) so that motor housing 26 is extended leftward from duct plate 25 so as to incorporate main motor assembly 11a mounted on duct plate 25. Main motor assembly 11a includes a cylinder block 29, axial plungers 30 reciprocally fitted into cylinder block 29, and a fixed swash plate 31 pressed against heads of plungers 30 projecting from cylinder block 29. Cylinder block 29 is slidably rotatably fitted to duct plate 25. Cylinder block 29 is fixed on motor shaft 28 so that motor shaft 28 serves as a rotary axis of cylinder block 29.

A right end portion of motor shaft 28 is journalled by duct plate 25 via a bearing, and is spline-fitted into a later-discussed spline sleeve 47 into which a left end portion of a later-discussed transmission input shaft 42 is also spline-fitted. A left end portion of motor shaft 28 is journalled by a left end portion of motor housing 26 via a bearing. In motor housing 26, swash plate 31 is fixed to the rear end portion of motor housing 26.

Hydraulic motor 11, including motor assembly 11a, duct plate 25, pump housing 26 and motor shaft 28, can be detached from transaxle housing 8 of transaxle 5 by loosening the bolts and separating duct plate 25 from the left end surface of motor mount plate 27. In this regard, the right end portion of motor shaft 28 spline-fitted in spline sleeve 47 can be easily released from spline sleeve 47 so as to facilitate the detachment of hydraulic motor 11 from transaxle housing 8.

Figure 10:
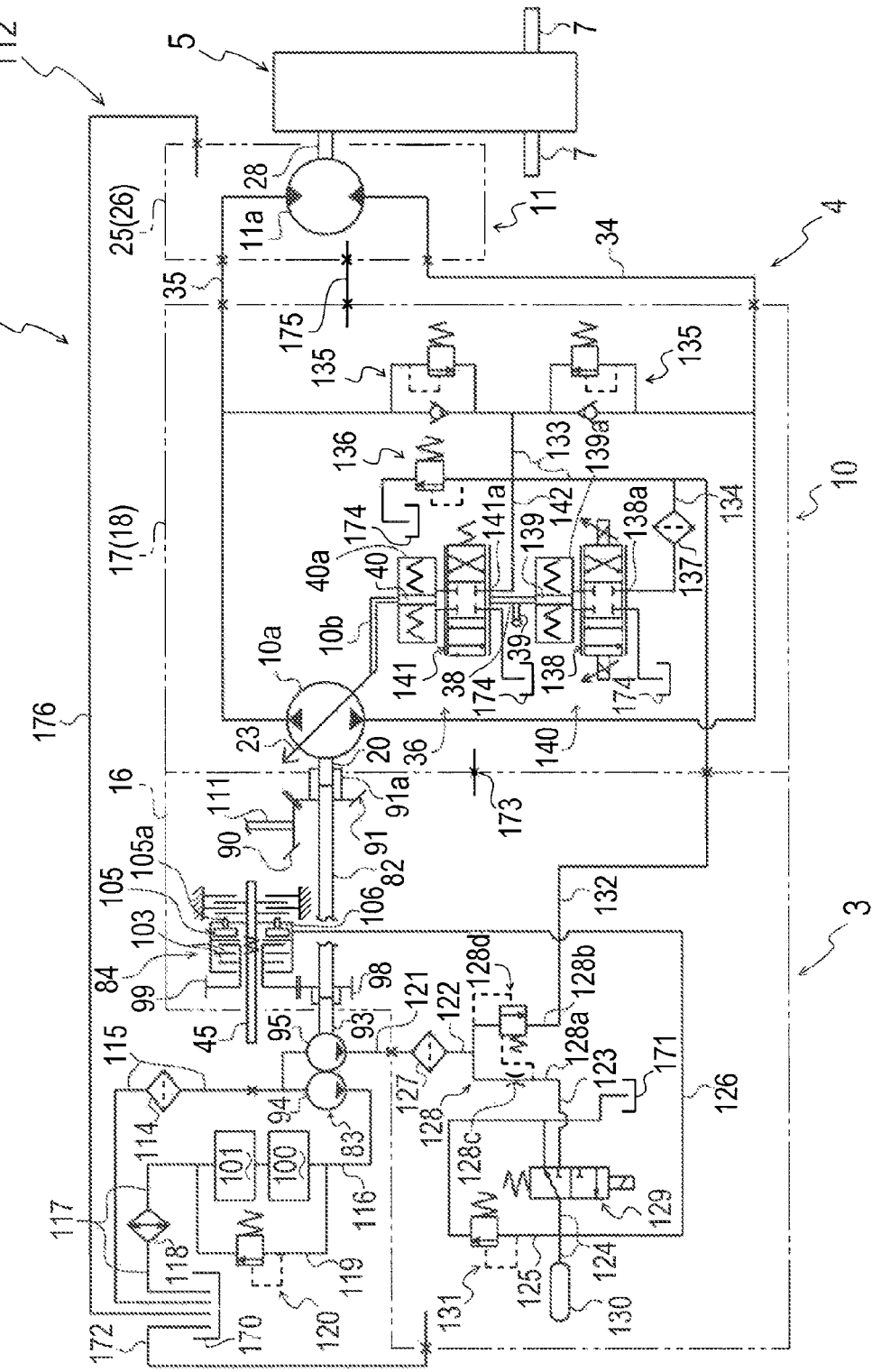
FIG. 10 is a hydraulic circuit diagram for the powertrain system.

As shown in FIG. 5, a pair of fluid ducts 32 are formed in duct plate 17. As shown in FIG. 3, a pair of fluid ducts 33 are formed in duct plate 25. One fluid duct 32, one fluid duct 33, and a fluid pipe that is interposed between duct plates 17 and 25 so as to fluidly connect the one fluid duct 32 to the one fluid duct 33 constitute an HST fluid passage 34 between hydraulic pump 10 and hydraulic motor 11. The other fluid duct 32, the other fluid duct 33, and another fluid pipe that is interposed between duct plates 17 and 25 so as to fluidly connect the other fluid duct 32 to the other fluid duct 33 constitute an HST fluid passage 35 between hydraulic pump 10 and hydraulic motor 11. Therefore, as shown in FIGS. 1 and 10, hydraulic pump 10, hydraulic motor 11 and HST fluid passages 34 and 35 interposed between hydraulic pump 10 and hydraulic motor 11 constitute HST 4, and HST fluid passages 34 and 35 constitute a closed fluid circuit of HST 4. Even if the rotary speed and direction of engine output shaft 12 driving pump shaft 20 is constant, the rotary speed of motor shaft 28 can be steplessly changed by steplessly changing the tilt angle of movable swash plate 23 of hydraulic pump 10, and the rotary direction of drive wheels 9 can be selected between forward and backward by selecting the tilt direction of movable swash plate 23 between the direction for forward traveling and the direction for backward traveling.

Referring to FIG. 5, movable swash plate 23 is assembled with a hydraulic servomechanism 36 in pump housing 18. A neutral holding mechanism 37 is disposed in a housing 41 fixed to an outside portion of pump housing 18. A pivot shaft 38 is pivotally supported by housing 41 and an HST control lever 39 is fixed on an outer end of pivot shaft 38 outside of housing 41. Therefore, movable swash plate 23 is operatively connected to pivot shaft 38 via hydraulic servomechanism 36 and neutral holding mechanism 37.

In this regard, referring to FIGS. 1, 5 and 10, hydraulic servomechanism 36 has a piston 40 serving as a hydraulic actuator for moving swash plate 23, a hydraulic cylinder 40a incorporating piston 40, and a directional control valve 141 for controlling the direction of fluid supply to hydraulic cylinder 40a. Directional control valve 141 is operatively connected to pivot shaft 38 so that the position of directional control valve 141 is proportionally controlled according to rotation of pivot shaft 38. Further, hydraulic pump 10 is provided with an HST control unit 140 including a piston 139 serving as a hydraulic actuator for controlling the rotation of pivot shaft 38, a hydraulic cylinder 139a incorporating piston 139, and proportional solenoid valve 138 serving as a directional control valve for controlling the direction of fluid supply to hydraulic cylinder 139a. As mentioned above, proportional solenoid valve 138 is commanded by controller 75 based on the detection signal from position sensor 79 detecting the depression degree of accelerator pedal 78 (and detection signals about operational positions of a later-discussed traveling direction setting lever 76 and a later-discussed traveling mode setting lever 60).

Referring to FIG. 1, vehicle 1 is equipped with a traveling direction setting lever 76 for deciding whether vehicle 1 travels forward or backward. Controller 75 receives a detection signal from a position sensor 77 detecting an operational position of traveling direction setting lever 76 so as to decide whether movable swash plate 23 is tilted in one direction for forward traveling of vehicle 1 or in another direction for backward traveling of vehicle 1. Then, once controller 75 receives a detection signal from position sensor 79 for accelerator pedal 78, controller 75 commands proportional solenoid valve 138 to set swash plate 23 at the tilt angle corresponding to the depression of accelerator pedal 78 and in the tilt direction decided based on the setting of traveling direction setting lever 76.

Neutral holding mechanism 37 functions to surely return movable swash plate 23 to a neutral position and to hold swash plate 23 at the neutral position when accelerator pedal 76 is returned to its neutral position (undressed position). Further, regardless of the electric control of proportional solenoid valve 138 for controlling hydraulic servomechanism 36 based on the operational positions of traveling direction setting lever 76 and accelerator pedal 78, HST control lever 39 can be optionally manipulated to forcibly control the tilt angle and direction of swash plate 23.

Referring to FIGS. 1, 2 and 3, transaxle housing 8 of transaxle 5 incorporates differential gear unit 64 differentially connecting right and left differential output shafts 7a to each other, and incorporates a sub speed-change gear transmission 50 for transmitting power from motor shaft 28 to differential gear unit 64. Sub speed-change gear transmission 50 includes transmission input shaft 42, a counter shaft 43, high and low speed gear trains interposed between shafts 42 and 43, a spline hub 56 and a shifter 57. In sub speed-change gear transmission 50, transmission input shaft 42 and a counter shaft 43, having lateral axes, are disposed in transaxle housing 8 and are extended parallel to each other and parallel to differential output shafts 7a. Transmission input shaft 42 is extended coaxially rightward from motor shaft 28. In this regard, spline sleeve 47 having a splined inner peripheral surface is fitted in duct plate 25 and motor mount plate 27, the right end portion of motor shaft 28 is spline-fitted into spline sleeve 47 via a left open end of spline sleeve 47, and the left end portion of transmission input shaft 42 is spline-fitted into spline sleeve 47 via a right open end of spline sleeve 47. Therefore, motor shaft 28 and transmission input shaft 42 are connected coaxially to each other so as to be rotatably integral with each other.

Transmission input shaft 42 is fixedly provided thereon with a high speed drive gear 51 and with a low speed drive gear 52 right-adjacent to high speed drive gear 51. On the other hand, counter shaft 43 is fixedly provided thereon with a final pinion 53, and is provided thereon with a high speed driven gear 54 on a right side of final pinion 53, so that high speed driven gear 54 is rotatable relative to counter shaft 43. High speed driven gear 54 is formed with a rightward extended central boss portion, and a low speed driven gear 55 is fitted on this central boss portion of high speed driven gear 54, so that low speed driven gear 55 is right-adjacent to high speed driven gear 54 and is rotatable relative to high speed driven gear 54. High speed driven gear 54 directly meshes with high speed drive gear 51 so that high speed gears 51 and 54 serve as the high speed gear train. Low speed driven gear 55 directly meshes with low speed drive gear 52 so that low speed gears 52 and 55 serve as the low speed gear train.

Low speed driven gear 55 is also formed with a center boss portion extended rightward on the central boss portion of high speed driven gear 54, and clutch teeth 55a are annularly formed on a right end of the center boss portion of low speed driven gear 55. The central boss portion of high speed driven gear 54 is further extended rightward from the right end of the central boss portion of low speed driven gear 55 and is fixedly provided with clutch teeth 54a annularly on a right end thereof, so that clutch teeth 54a and clutch teeth 55a are aligned to have a gap therebetween.

Spline hub 56 is fixed on counter shaft 43 on the right side of high speed driven gear 54 so that a splined outer peripheral surface of spline hub 56 is right-adjacent to clutch teeth 54a on the right end of the central boss portion of high speed driven gear 54. Right clutch teeth and left clutch teeth are formed on the inner peripheral surface of shifter 57. The right clutch teeth of shifter 57 constantly mesh with the splines on the outer peripheral surface of spline hub 56 so that shifter 57 is axially slidable on spline hub 56 and is unrotatable relative to spline hub 56.

Due to leftward slide of shifter 57 on spline hub 56, shifter 57 is shiftable from a high speed position to a low speed position via a neutral position. The left clutch teeth of shifter 57 at the high speed position mesh with clutch teeth 54a of high speed driven gear 54 so as to drivingly connect high speed driven gear 54 to counter shaft 43 via shifter 57 and spline hub 56, thereby transmitting the rotary power of transmission input shaft 42 to counter shaft 43 via the high speed gear train, i.e., high speed gears 51 and 54. The left clutch teeth of shifter 57 at the neutral position are disposed in the gap between clutch teeth 54a and clutch teeth 55a so as to disengage from both clutch teeth 54a and clutch teeth 55a, thereby isolating counter shaft 43 from the rotary power of transmission input shaft 42. The left clutch teeth of shifter 57 at the low speed position mesh with clutch teeth 55a of low speed driven gear 55 so as to drivingly connect low speed driven gear 55 to counter shaft 43 via shifter 57 and spline hub 56, thereby transmitting the rotary power of transmission input shaft 42 to counter shaft 43 via the low speed gear train, i.e., low speed gears 52 and 55.

A fork 58 fitted on shifter 57 is provided on a fork shaft (not shown) that is axially moved by an actuator (not shown) electrically controlled by controller 75. Vehicle 1 is equipped with traveling mode setting lever 60 serving as a sub speed control manipulator of vehicle 1, which is shiftable among a work traveling position 61, a neutral position 62 and a normal traveling position 63. Controller 75 receives a detection signal from a position sensor 71 detecting at which of positions 61, 62 and 63 traveling mode setting lever 60 is set, and commands the actuator for moving the fork shaft of fork 58 so as to set shifter 56 at one of the low speed position, the neutral position and the high speed position. The low speed position of shifter 56 corresponds to work traveling position 61 of traveling mode setting lever 60. The neutral position of shifter 56 corresponds to neutral position 62 of traveling mode setting lever 60. The high speed position of shifter 56 corresponds to normal traveling position 63 of traveling mode setting lever 60. Further, due to the detection signal from position sensor 71, controller 75 may also command proportional solenoid valve 138 for controlling the tilt angle of swash plate 23 of HST 4 (and/or actuator 70 for controlling throttle 2a of engine 2) so as to control the rotary speed of motor shaft 28 (and/or engine output shaft 12) in correspondence to the set state of sub speed-change gear transmission 50. Alternatively, the fork shaft may be operatively connected to traveling mode setting lever 60 via a mechanical linkage without the electrically controlled actuator.

A PTO housing 49 is fixed on a right side surface of transaxle housing 8. A PTO transmission shaft 44 having a lateral axis parallel to differential output shafts 7a is journalled in PTO housing 49. A spline sleeve 48 that is similar to spline sleeve 47 is disposed in a junction portion between PTO housing 49 and transaxle housing 8. A right end portion of counter shaft 43 and a left end portion of PTO transmission shaft 44 are spline-fitted into spline sleeve 48 so that counter shaft 43 and PTO transmission shaft 44 are connected coaxially to each other so as to be rotatably integral with each other.

A PTO shaft 46 having a fore-and-aft axis perpendicular to differential output shafts 7a is journalled in PTO housing 49 and projects forward from PTO housing 49. In PTO housing 49, a bevel gear 66 is fixed on PTO transmission shaft 44, a bevel gear 67 is fixed on PTO shaft 46, and bevel gears 66 and 67 mesh with each other so as to transmit power from PTO transmission shaft 44 to PTO shaft 46. Further, a right end portion of PTO transmission shaft 44 projects rightward from PTO housing 49 so as to be adaptable to have a parking brake 68 thereon as shown in FIG. 1. In this way, PTO shaft 46 receives the output power of HST 4 driven by engine 2 via sub speed-change gear transmission 50. Therefore, for example, PTO shaft 46 is adaptable to be drivingly connected to other drive wheels (e.g., front wheels if drive wheels 9 are rear wheels) of vehicle 1 that should be driven synchronously to drive wheels 9 drivingly connected to differential gear unit 64.

Final pinion 53 fixed on counter shaft 43 directly meshes with an input gear 65 of differential gear unit 64 so that differential gear unit 64 receives the rotary power of transmission input shaft 42 via the selected high or low speed gear train and counter shaft 43 and differentially distributes the power between right and left differential output shafts 7a. Further, differential gear unit 64 is provided with a differential locker 69 for locking the differential rotation of differential output shafts 7a, i.e., for rotatably integrating right and left drive wheels 9 with each other.

Gear unit 3 will be described with reference to FIGS. 1, 4 to 10. Gear unit 3 includes gearbox 16, a transmission shaft 111, a pump drive shaft 82, a PTO shaft 45 and a PTO clutch 84. In gearbox 16, transmission shaft 111 is extended leftward from flywheel 14 and coaxially to engine output shaft 12, pump drive shaft 82 is extended in the fore-and-aft direction of vehicle 1 perpendicular to engine output shaft 12, and PTO shaft 45 is extended parallel to pump drive shaft 82, i.e., perpendicular to engine output shaft 12.

Figure 6:
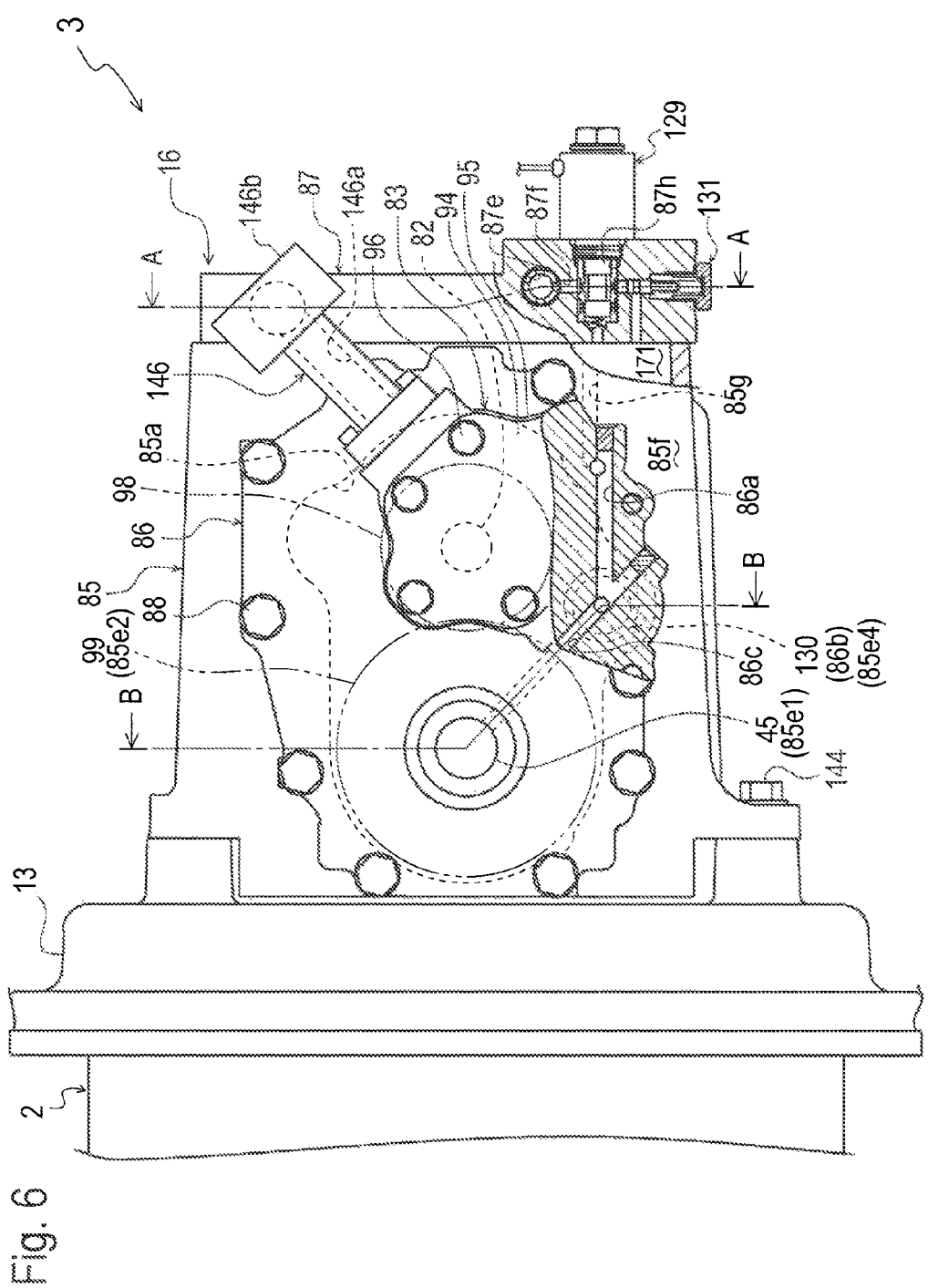
FIG. 6 is a front view partly in section of the gear unit.
Figure 7:
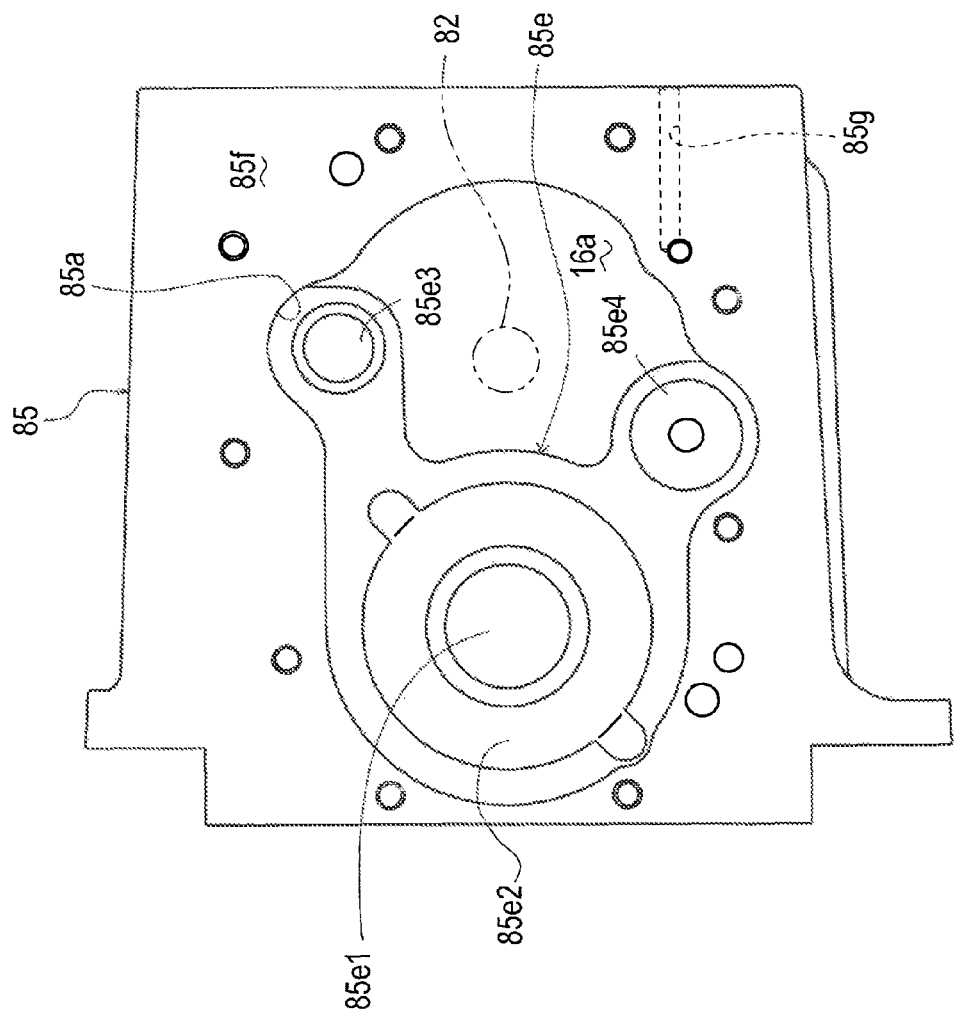
FIG. 7 is a front view of a main box member for a gearbox of the gear unit.
Figure 8:
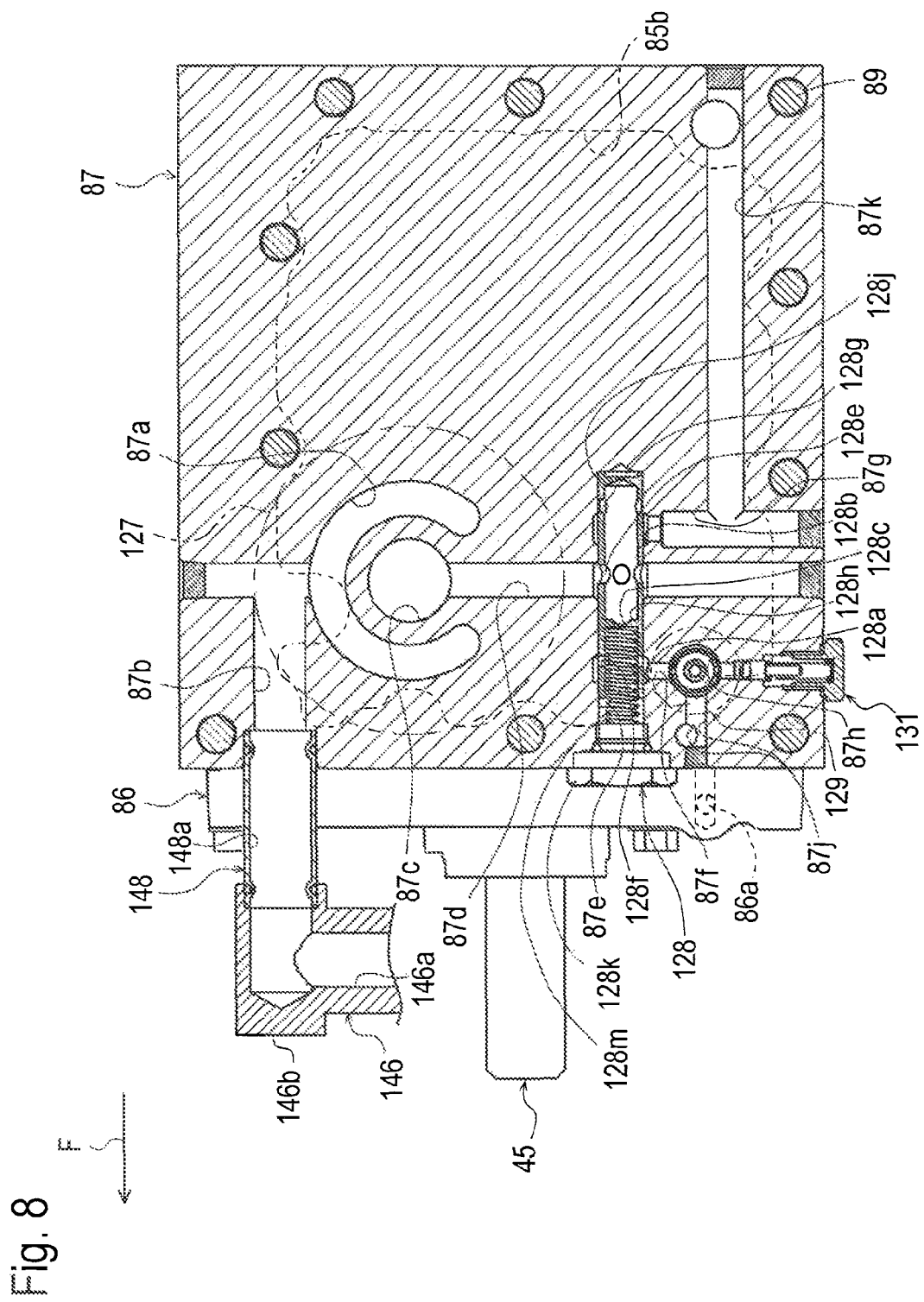
FIG. 8 is a sectional side view of the gear unit, showing an interior structure of a side cover of the gearbox.

Referring to FIGS. 5 to 9, gearbox 16 includes a main box member 85, an oval front cover 86, and a rectangular side cover 87. Main box member 85 has a front hole 85a open at a front surface of main box member 85. As shown in FIG. 7, front hole 85a is substantially oval in the front view so as to correspond to the oval shape of front cover 86. Front cover 86 is fastened to main box member 85 by bolts 88 arranged so as to surround front hole 85a as shown in FIG. 6, thereby covering front hole 85a. Main box member 85 also has a side hole 85b open at a right or left (in this embodiment, left) surface of main box member 85. Side cover 87 is fastened to main box member 85 by bolts 89 arranged so as to surround side hole 85b as shown in FIG. 8, thereby covering side hole 85b.

Referring to FIGS. 5 and 6, a right side wall 85d of main box member 85 is fastened to a left side surface of flywheel housing 13 by bolts 144, so that gear unit 3 can be separated from flywheel housing 13 of engine 2 by loosening bolts 144 and separating main box member 85 from flywheel housing 13. As shown in FIG. 5, a spline sleeve 14a having a splined inner peripheral surface is disposed coaxially to engine output shaft 12, and is joined to flywheel 14 via a damper.

Referring to FIGS. 1 and 5, transmission shaft 111 is extended in the lateral direction of vehicle 1 in main box member 85 and is spline-fitted at a right end portion thereof into spline sleeve 14a so as to be connected coaxially to engine output shaft 12 via spline sleeve 14a. As shown in FIGS. 5 to 7, a rearward portion of right side wall 85d of main box member 85 is expanded leftward to the lateral middle portion of main box member 85 (or in other words, a rightward portion of rear wall 85c of main box member 85 is expanded forward to the fore-and-aft middle portion of main box member 85) so as to form a support wall 85e journaling transmission shaft 111. Gearbox 16 is provided therein with a cavity 16a leftward and forward from support wall 85e so that cavity 16a is defined by main box member 85, front cover 86 and side cover 87. As discussed later, a portion of cavity 16a leftward from support wall 85e is used to locate pump drive shaft 82, and a portion of cavity 16a forward from support wall 85e is used to locate PTO shaft 45 and PTO clutch 84.

As shown in FIG. 5, a left end portion of transmission shaft 111 projects leftward from support wall 85e into cavity 16a, and a bevel gear 90 is formed on the left end of transmission shaft 111 in cavity 16a. Pump drive shaft 82 is extended in the fore-and-aft horizontal direction of vehicle 1 and is disposed in cavity 16a of gearbox 16 leftward from transmission shaft 111. A rear end portion of pump drive shaft 82 is spline-fitted into bevel gear 91 journalled by a rear wall 85c of main box member 85 via a bearing 92. Bevel gear 91 is formed with an axial boss portion 91a extended rearward into duct plate 17 fixed on the rear end surface of gearbox 16, i.e., a rear end surface of rear wall 85c of main box member 85. The front end portion of pump shaft 20 is spline-fitted into axial boss portion 91a in fluid duct 17 so as to rotatably integrate pump drive shaft 82 with pump shaft 20 extended coaxially rearward from pump drive shaft 82.

In cavity 16a of gearbox 16, bevel gear 91 on pump drive shaft 82 (and pump shaft 20) meshes with bevel gear 90 on the left end of transmission shaft 111. In this embodiment, bevel gears 90 and 91 have the same diameter so as to serve as a constant speed gear train. However, any gear ratio between gears 90 and 91 may be adapted so that gears 90 and 91 may serve as a speed reduction gear train or a speed increasing gear train.

As shown in FIG. 5, a front end portion of pump drive shaft 82 is spline-fitted into a spur gear 98. Spur gear 98 is fixedly provided on a front end thereof with a boss member 98a that is extended forward and journalled by front cover 86 via a bearing 97. An auxiliary pump shaft 93 is spline-fitted at a rear end portion thereof into boss member 98a so that auxiliary pump shaft 93 is extended coaxially forward from pump drive shaft 82 and rotatably integrally with pump drive shaft 82.

As shown in FIGS. 4, 5 and 6, an auxiliary pump unit 83 is mounted onto a leftward front surface of front cover 86 of gearbox 16. Auxiliary pump unit 83 includes hydraulic pumps 94 and 95. Hydraulic pump 95 is mounted on the leftward front surface of front cover 86 so as to extend forward from front cover 86, and hydraulic pump 94 is mounted on a front surface of hydraulic pump 95 so as to extend forward from hydraulic pump 95. As shown in FIG. 5, hydraulic pump 94 is fastened to front cover 86 by bolt (or bolts) 96 through hydraulic pump 95 between hydraulic pump 94 and front cover 86, thereby fixing auxiliary pump unit 83 including hydraulic pumps 94 and 95 to gearbox 16. Further, bolt (or bolts) 96a fastens only hydraulic pump 95 (without hydraulic pump 94) to front cover 86 so as to facilitate auxiliary pump unit 83 to be removed from front cover 86 as keeping the assembly state of hydraulic pumps 94 and 95. Further, auxiliary pump unit 83 as mounted on front cover 86 can be easily removed from gearbox 16 of gear unit 3 by separating front cover 86 from main box member 85 and by separating auxiliary pump shaft 93 from pump drive shaft 82 (out of consideration of whether PTO shaft 45 with (Or without) PTO clutch 84 should be separated from front cover 86 or should be let as attached to front cover 86).

Auxiliary pump shaft 93 is extended forward from pump drive shaft 82 into auxiliary pump unit 83 via spur gear 98 and boss member 98a as mentioned above so as to serve as a drive shaft for driving hydraulic pumps 94 and 95. One of hydraulic pumps 94 and 95. (in this embodiment, hydraulic pump 94) supplies fluid to a power steering actuator 100 and a cargo deck lifting actuator 101 (see FIG. 10), and the other of hydraulic pumps 94 and 95 (in this embodiment, hydraulic pump 95) supplies fluid to a later-discussed PTO clutch 84 and serves as a charge pump for supplying fluid to the closed fluid circuit of HST 4. Especially, hydraulic pump 95 will be referred to as "charge pump 95" in consideration of its function as the charge pump for supplying fluid to the closed fluid circuit of HST 4.

In this way, pump shaft 20 of hydraulic pump 10 and auxiliary pump shaft 93 of auxiliary pump unit 83 are disposed coaxially opposite each other in the fore-and-aft direction of vehicle 1 with respect to pump drive shaft 82. Therefore, pump shaft 20 and auxiliary pump shaft 93 (or hydraulic pump 10 and auxiliary pump unit 83) have no gap therebetween in their radial directions, thereby minimizing gear unit 3 in their radial directions, e.g., in the lateral and vertical directions of vehicle 1.

Figure 12:
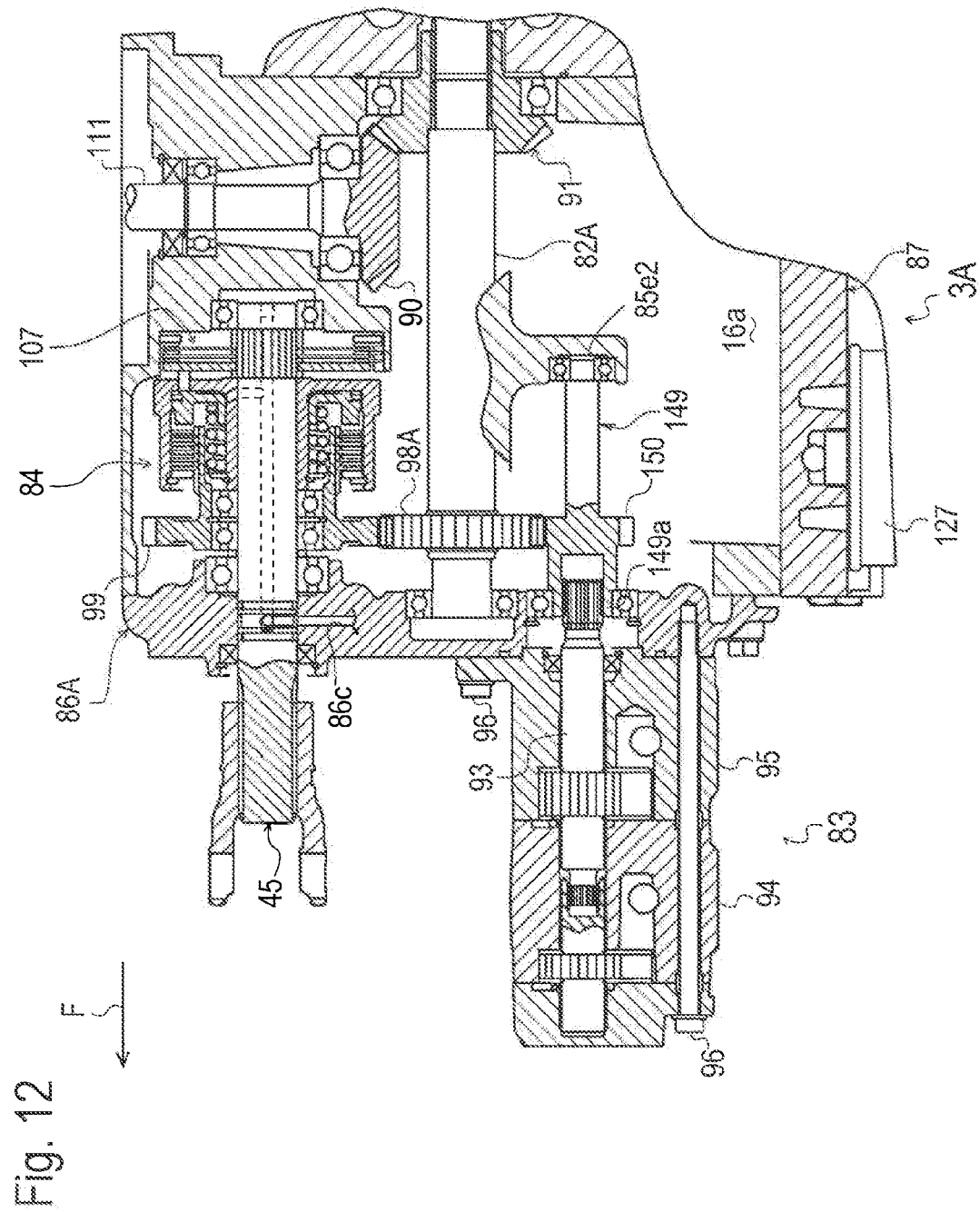
FIG. 12 is a developed sectional plan view of an alternative gear unit.
Figure 13:
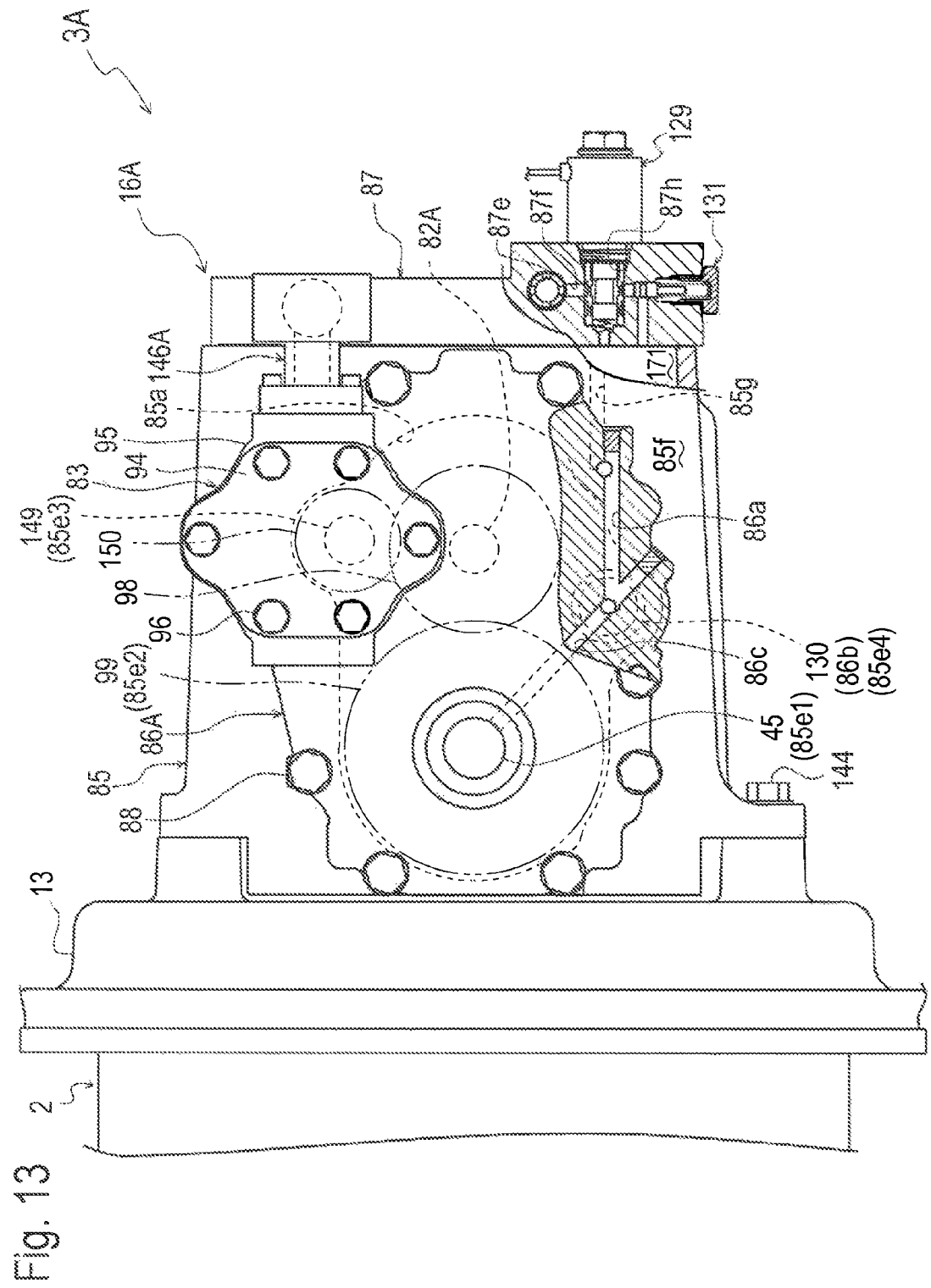
FIG. 13 is a front view partly in section of the alternative gear unit.

Incidentally, referring to FIG. 7, an upper portion of support wall 85e of main box member 85 is expanded leftward above pump drive shaft 82 so as to have a forward open recess 85e3. This recess 85e3 is not used when main box member 85 is used to constitute gearbox 16 of gear unit 3 having auxiliary pump shaft 93 disposed coaxially to pump drive shaft 82, however, recess 83e3 is used for supporting a rear end of a transmission shaft 149 disposed coaxially to auxiliary pump shaft 93 and parallel to an alternative pump drive shaft 82A as shown in FIGS. 12 and 13 when main box member 85 is used to constitute an alternative gearbox 16A of an alternative gear unit 3A, as discussed later.

Referring to FIGS. 1, 5, 6, 7 and 8, in the portion of cavity 16a of gearbox 16 forward from support wall 85e supporting lateral horizontal transmission shaft 111, PTO shaft 45 is extended in the fore-and-aft horizontal direction of vehicle 1, i.e., parallel to pump drive shaft 82. In other words, the laterally axial length of transmission shaft 111 ensures a space for locating PTO shaft 45 between pump drive shaft 82 and the right end portion of gearbox 16 defined by right wall 85d of main box member 85, so that PTO shaft 45 and pump drive shaft 82 are juxtaposed right and left. PTO shaft 45 is journalled at an axial intermediate portion thereof by front cover 86 via a bearing, and is journalled at a rear end portion thereof by support wall 85e of main box member 85 via a bearing fitted in a forward open bearing recess 85e1 formed in support wall 85e. A front end portion of PTO shaft 45 projects forward from gearbox 16 via front cover 86 so as to be adaptable for driving connection to a working implement.

Referring to FIGS. 1, 5, 6, 9 and 10, in cavity 16a of gearbox 16, a spur gear 99 is fitted on PTO shaft 45 immediately rearward from front cover 86 so as to be rotatable relative to PTO shaft 45, and meshes with spur gear 98. In this embodiment, gear 99 is diametrically larger than gear 98 so that gears 98 and 99 constitute a speed reduction gear train. However, any gear ratio between gears 98 and 99 may be adapted so that gears 98 and 99 may serve as a constant speed gear train or a speed increasing gear train.

Referring to FIGS. 1, 5, 6, 9 and 10, in the portion of cavity 16a of gearbox 16 forward from support wall 85e, PTO clutch 84 is provided on PTO shaft 45 so as to be interposed between PTO shaft 45 and gear 98. PTO clutch 84 includes a cylindrical clutch casing 102, friction elements 103, a spring 104 and a clutch piston 105. Clutch casing 102 is formed with an axial boss 102a that is fixedly fitted on PTO shaft 45. Gear 99 is formed with a cylindrical inner driver 99a that is extended rearward into a space between an inner peripheral surface of clutch casing 102 and an outer peripheral surface of axial boss 102a of clutch casing 102. Friction elements 103 aligned in the fore-and-aft direction of vehicle 1 are disposed between the inner peripheral surface of clutch casing 102 and the outer peripheral surface of inner driver 99a of gear 99.

Clutch casing 102 is formed with a vertical rear end wall extended centripetally therefrom to be joined to a rear end of axial boss 102a. Clutch piston 105 is disposed slidably in the fore-and-aft direction of vehicle 1 between a rearmost one of friction elements 103 and the vertical rear end wall of clutch casing 102. Spring 104 is disposed between inner driver 99a of gear 99 and axial boss 102a of clutch casing 102 so as to bias clutch piston 105 rearward. A gap between clutch piston 105 and the rear end wall of clutch casing 102 serves as a clutch operating fluid chamber 106 (see FIG. 10). When fluid is supplied to clutch operating fluid chamber 106, clutch piston 105 is slid forward by a pressure of fluid supplied in clutch operating fluid chamber 106 against spring 104 so as to press friction elements 103 against each other, i.e., so as to engage PTO clutch 84, thereby drivingly connecting PTO shaft 45 to gear 99 driven by engine 2. When fluid is drained from clutch operating fluid chamber 106, clutch piston 105 is pressed rearward against the rear end wall of clutch casing 102 by spring 104 so as to separate friction elements 103 from each other, i.e., so as to disengage PTO clutch 84, thereby isolating PTO shaft 45 from the rotary power of gear 99 driven by engine 2.

Figure 9:
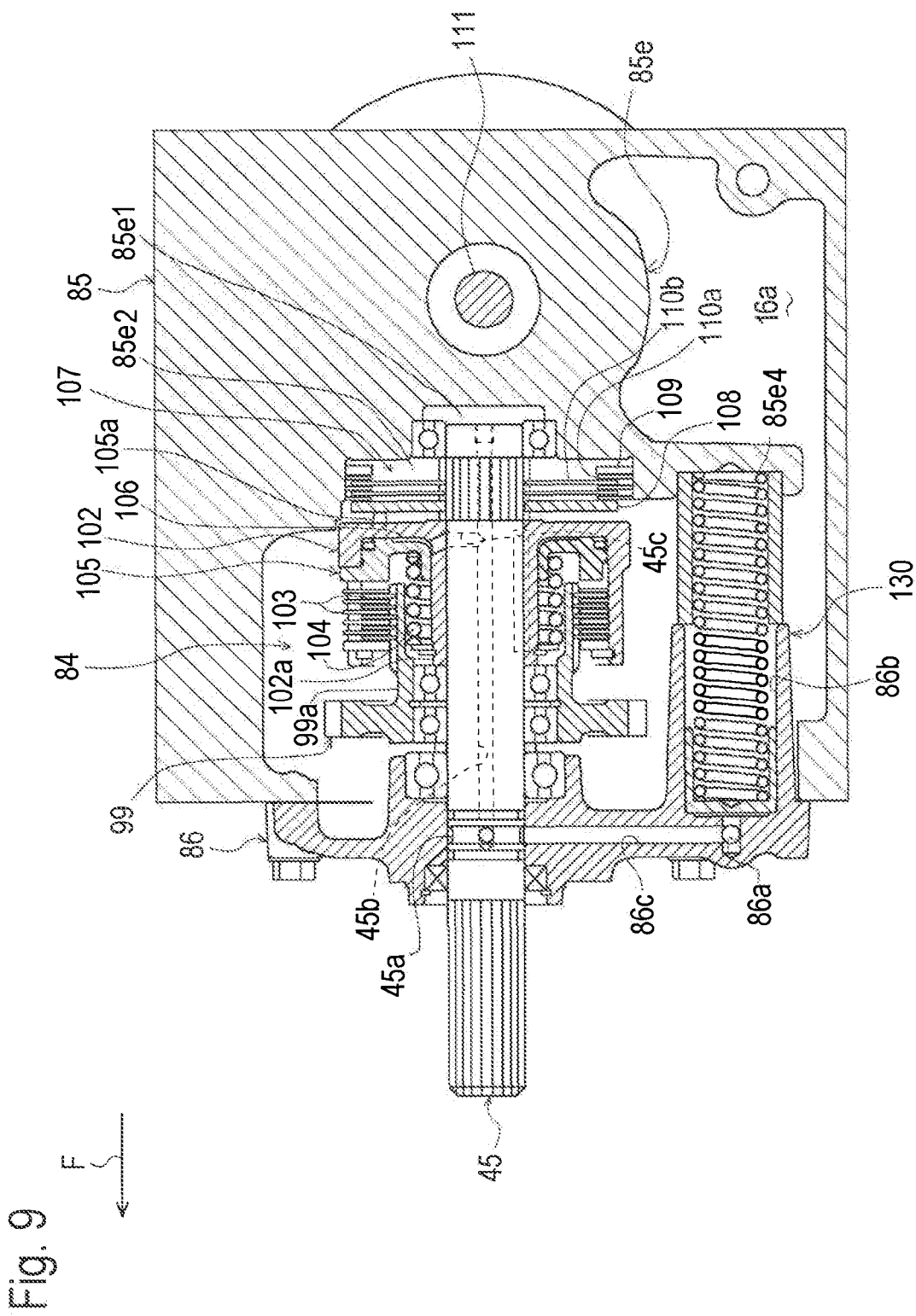
FIG. 9 is a sectional side view of the gear unit, showing an interior structure of the main gear member of the gearbox.

Referring to FIGS. 5, 6 and 7, support wall 84e is recessed with a forward open brake chamber 85e2. As shown in FIG. 7, in front view, brake chamber 85e2 and above-mentioned bearing recess 85e1 are defined as concentric circles, so that bearing recess 85e1 is disposed at the center of brake chamber 85e2 in the front view, and is recessed further rearward from brake chamber 85e2 as shown in FIGS. 5 and 9. A PTO brake 107 is provided on PTO shaft 45 in break chamber 85e2 rearward from PTO clutch 84 and forward from the rear end of PTO shaft 45 journalled in bearing recess 85e1.

PTO brake 107 includes a ring-shaped brake pad 108, friction elements 110a and 110b, and a brake retainer 109. Friction elements 110b are aligned in the axial direction of PTO shaft 45 rearward from brake pad 108. Brake pad 108 and friction elements 110b are fitted to PTO shaft 45 so as to be axially slidable and unrotatable relative to PTO shaft 45. Friction elements 110a are aligned in the axial direction of PTO shaft 110a alternately with friction elements 110b. Friction elements 110a are fitted to an inner peripheral surface of support wall 85e defining brake chamber 85e2 so as to be axially slidable and unrotatable relative to support wall 85e, i.e., gearbox 16. Brake retainer 109 is disposed rearward from friction elements 110a and 110b and is fixed to the inner peripheral surface of support wall 85e defining brake chamber 85e2.

Clutch piston 105 is fixedly provided with a brake pin 105a projecting rearward from a rear surface thereof. Brake pin 105a penetrates the rear end wall of clutch housing 102 and further projects rearward to approach brake pad 108. When clutch piston 105 is disposed at its rearmost slide position due to the rearward biasing force of spring 104 so as to disengage PTO clutch 84, brake pin 105a projecting rearward from clutch piston 105a presses friction elements 110a and 110b against each other between brake pad 108 and brake retainer 109 so that PTO brake 107 functions to brake PTO shaft 45, thereby preventing inertial rotation or unexpected rotation of PTO shaft 45 during the disengagement of PTO clutch 84. When clutch piston 105 is disposed at its foremost slide position by the pressure of fluid supplied to clutch operating fluid chamber 106 against spring 104 so as to engage PTO clutch 84, brake pin 105a is separated forward from brake pad 108, so that friction elements 110a and 110b are separated from each other, thereby allowing the rotation of PTO shaft 45 free from PTO brake 107.

Due to the above-mentioned structure, the rotary power of engine output shaft 12 as the output power of engine 2 is transmitted to pump drive shaft 82 via flywheel 14, transmission shaft 111 and bevel gears 90 and 91. The rotary power of pump drive shaft 82 is transmitted forward to hydraulic pumps 94 and 95 of auxiliary pump unit 83 via auxiliary pump shaft 93, is transmitted rearward to hydraulic pump 10 of HST 4 via pump shaft 20, and is also transmitted via reduction gears 98 and 99 and engaged PTO clutch 107 to PTO shaft 45 disposed rightward from pump drive shaft 82.

A hydraulic circuit 112 for powertrain system 6 shown in FIG. 10 will be described. Hydraulic pumps 94 and 95 of pump unit 83 suck fluid from a main tank 170 via a pipe 115 and a line filter 114 on the way of pipe 115. A delivery port of hydraulic pump 94 is connected to actuators 100 and 101 via pipe 116. Actuators 100 and 101 are connected to main tank 170 via a pipe 117 and a fluid cooler 118 on the way of pipe 117. A bypass passage 119 is interposed between pipes 116 and 117. A pressure regulation relief valve 120 is disposed on the way of bypass passage 119 so that when a pressure in pipe 116 is going to increase to an excessive level, relief valve 120 is opened to bypass fluid through bypass passage 119 bypassing between pipes 116 and 117, thereby regulating the pressure in pipe 116.

Hydraulic pump 94 is driven by rotating pump drive shaft 82 and auxiliary pump shaft 93 so as to suck fluid from main tank 170, and so as to deliver fluid to actuators 100 and 101 via pipe 115 with line filter 114 and via pipe 116. The fluid having been used to drive actuators 100 and 101 is cooled by fluid cooler 118, and is drained to main tank 170 via pipe 117.

A delivery port of charge pump 95 is connected to an inlet port of line filter 127 via a fluid passage 121. An outlet port of line filter 127 is connected to a priority valve 128 via a fluid passage 122. Priority valve 128 bifurcates fluid passage 122 into an outlet port 128a with an orifice 128c and another outlet port 128b with a pressure regulation valve 128d. Outlet port 128a is adapted to supply fluid to PTO clutch 84 via orifice 128c thereon. Outlet port 128b is adapted to supply fluid to HST 4 via pressure regulation valve 128d thereon. The fluid supplied to HST 4 is used as supplementary fluid for circulation of fluid between hydraulic pump 10 and hydraulic motor 11, and is also used for operating movable swash plate 23 of hydraulic pump 10. Priority valve 128 is configured so that fluid flows to outlet port 128a in preference to outlet port 128b, thereby keeping friction elements 103 of PTO clutch 84 from seizing even if the amount of fluid delivered from charge pump 95 is reduced.

Outlet port 128a is connected to a solenoid valve serving as clutch control valve 129. When the solenoid of clutch control valve 129 is energized, clutch control valve 129 connects fluid passage 123 to an accumulator 130 via a fluid passage 124. When the solenoid of clutch control valve 129 is unenergized, clutch control valve 129 shuts off fluid passage 123 from a fluid sump 171 in gearbox 16 and connects fluid passage 124 to fluid sump 171 in gearbox 16. Fluid passage 124 is connected via a fluid passage 125 to a relief valve 131 for regulating a pressure of fluid to PTO clutch 84, and is connected to clutch operating fluid chamber 106 of PTO clutch 84 via a fluid passage 126.

Fluid sump 171 is fluidly connected to main tank 170 via a pipe 172. Hydraulic pump 10 includes a fluid sump 174 in pump housing 18 (or duct plate 17) so as to recover fluid drained from main pump assembly 10a including the pair of fluid ducts 32 as a part of the closed fluid circuit of HST 4, and has a port 173 at a front surface of duct plate 17 facing fluid sump 171 in gearbox 16 so that fluid overflowing from fluid sump 174 can be released to fluid sump 171 in gearbox 16 via port 173. Further, a pipe 175 is interposed between pump housing 18 (or duct plate 17) of hydraulic pump 10 and motor housing 26 (or duct plate 25) of hydraulic motor 11 so as to fluidly connect fluid sump 174 in hydraulic pump 10 to a fluid sump in motor housing 26. A pipe 176 is interposed between motor housing 26 (or duct plate 25) and main tank 170 so as to fluidly connect the fluid sump in hydraulic motor 11 to main tank 170. In this way, hydraulic pump 10, hydraulic motor 11 and gearbox 16 have respective fluid sumps fluidly connected to each other and to main tank 170, thereby adjusting their fluid sumps in volume and pressure.

Due to the above-mentioned structure, when pump drive shaft 82 and auxiliary pump shaft 93 are rotated, fluid in main tank 170 is sucked by charge pump 95 and is supplied from charge pump 95 to clutch control valve 129 via pipe 115 with line filter 114, fluid passage 121, line filter 127, fluid passage 122, outlet port 128a of priority valve 128 with orifice 128c and fluid passage 123. When the solenoid of clutch control valve 129 is energized, clutch control valve 129 supplies the fluid to clutch operating fluid chamber 106 of PTO clutch 84 via fluid passages 124 and 126 so as to engage PTO clutch 84 (pressing friction elements 103). In this regard, accumulator 130 connected to fluid passage 124 absorbs surplus fluid from fluid passage 124 so as to prevent sudden pressing of friction elements 103 causing a shock of PTO clutch 84 when engaging. When the solenoid of clutch control valve 129 is not energized, clutch control valve 129 drains fluid from clutch operating fluid chamber 106 to fluid sump 171. Further, fluid released from relief valve 131 for regulating the pressure of fluid supplied to clutch operating fluid chamber 106 is also drained to fluid sump 171.

A fluid passage 132 is connected to outlet port 128b of priority valve 128 with relief valve 128d is bifurcated into a charge fluid passage 133 and a pilot fluid passage 134. A charge check relief valve 135 is interposed between charge fluid passage 133 and main fluid passage 34, and another charge check relief valve 135 between charge fluid passage 133 and main fluid passage 35. A relief valve 136 is connected to charge fluid passage 133 so as to regulate a pressure of fluid in fluid passage 133, i.e., a pressure of fluid supplied to main fluid passages 34 and 35 (serving as the closed fluid circuit of HST 4) via an opened charge check valve of charge check relief valve 135.

As mentioned above, movable swash plate 23 of hydraulic pump 10 is operatively connected to piston 40 of hydraulic servomechanism 36 including hydraulic cylinder 40a and directional control valve 141. Piston 40 divides an inner space of hydraulic cylinder 40a into two fluid chambers. Therefore, directional control valve 141 is adapted to control the direction of fluid supply to the fluid chambers in hydraulic cylinder 40a.

Further, as mentioned above, directional control valve 141 is operatively connected to pivot shaft 38 of HST control lever 39, and is also operatively connected to piston 139 of HST control unit 140. HST control unit 140 includes hydraulic cylinder 139a formed in housing 41. Piston 139 divides an inner space of hydraulic cylinder 139a into two fluid chambers. Therefore, proportional solenoid valve 138 serving as a directional control valve for shifting piston 139 is adapted to control the direction of fluid supply to the fluid chambers in hydraulic cylinder 139a according to commands from controller 75 based on detection of operational positions of traveling mode setting lever 60, traveling direction setting lever 76 and accelerator pedal 78.

Proportional solenoid valve 138 has a fluid supply port 138a for supplying fluid to one of the fluid chambers of hydraulic cylinder 139a. Fluid supply port 138a is joined to a fluid passage 134 with a line filter 137 branched from fluid passage 133 for supplying the fluid delivered from charge pump 95 to main fluid passages 34 and 35 of HST 4. On the other hand, directional control valve 141 has a fluid supply port 141a for supplying fluid to one of the fluid chambers of hydraulic cylinder 40a. Fluid supply port 141a is joined to a fluid passage 142 branched from fluid passage 133. Tank ports of proportional control valve 138 and directional control valve 141 are fluidly connected to fluid sump 174 in hydraulic pump 10.

Concrete structures realizing the fluid passages of hydraulic circuit 112 will be described with reference to FIGS. 5 to 10. As shown in FIGS. 5 and 8, line filter 127 is fixed at a basal portion thereof onto a left side surface of side cover 87. A hole 87a is formed in side cover 87 and is joined to an inlet port of line filter 127 so as to supply fluid therefrom to line filter 127. Hole 87a is arcuate in side view as shown in FIG. 8. A fore-and-aft horizontal hole 87b is formed in an upper portion of side cover 87. A front end of horizontal hole 87b is open at an upper portion of a front end surface of side cover 87, and a rear end of horizontal hole 87b is joined to a top of arcuate hole 87a.

Referring to FIGS. 5, 6 and 8, the front end of fore-and-aft horizontal hole 87b open at the front end surface of side cover 87 is disposed at a left upper corner of a front portion of gearbox 16. The front end of hole 87b serves as an inlet port of the fluid passage in gearbox 16 upstream of line filter 127 to be connected to a delivery port of charge pump 95. On the other hand, auxiliary pump unit 83 is mounted on front cover 86 rightward from side cover 87 at a vertical middle area of the front portion of gearbox 16 so as to have auxiliary pump shaft 93 extended coaxially forward from pump drive shaft 82. In this way, charge pump 95 of auxiliary pump unit 83 is considerably rightwardly lower than hole 87b so as to need piping to cover such a distance between charge pump 95 and hole 87b.

Therefore, referring to FIGS. 6 and 8, charge pump 95 is arranged to have an outwardly open delivery port at a rightward upper portion thereof, and a fluid delivery pipe 146 defining a through hole 146a serving as a fluid duct is extended leftwardly upward from charge pump 95. In this regard, fluid delivery pipe 146 is formed at a bottom end thereof with a flange that is fastened to the rightward upper portion of charge pump 95 by bolts or the like so as to fluidly connect hole 146a to the delivery port of charge pump 95. Therefore, fluid delivery pipe 146 is detachable by separating the bottom flange of pipe 146 from charge pump 95. A leftward upper end portion of fluid delivery pipe 146 is formed as a bent portion 146b expanding in the fore-and-aft direction. Hole 146a having an open end at the flanged bottom end of fluid delivery fluid delivery pipe 146 joined to charge pump 95 is extended along the leftwardly upward extension of fluid delivery pipe 146, and is bent at an upper end portion thereof rearward in bent portion 146b so as to be open at a rear end of bent portion 146b.

As shown in FIG. 8, a fore-and-aft horizontal connection pipe 148 is interposed between the rear end of bent portion 146b of fluid delivery pipe 146 and the front end of side cover 87, so that hole 146a in fluid delivery pipe 146 is connected to hole 87b in side cover 87 via a through hole 148a defined by connection pipe 148. In this way, hole 146a in fluid delivery pipe 146, hole 148a in connection pipe 148, and holes 87a and 87b in side cover 87 constitute fluid passage 121 in hydraulic circuit 112 shown in FIG. 10 as interposed between the delivery port of charge pump 95 and line filter 127.

As shown in FIGS. 5 and 8, side cover 87 is formed therein with a hole 87c that is disposed at a center of concentric circle defined by arcuate hole 87a. Hole 87c is joined to an outlet port of line filter 127 so as to receive fluid delivered from line filter 127. Side cover 87 is further formed therein with a vertical hole 87d extended downward from hole 87c. Holes 87c and 87d in side cover 87 constitute fluid passage 122 in hydraulic circuit 112 shown in FIG. 10 as interposed between line filter 127 and priority valve 128.

As shown in FIG. 8, a fore-and-aft horizontal valve hole 87e is formed in side cover 87 so as to cross a vertical intermediate portion of vertical hole 87d. A front end of valve hole 87e is open at the front end surface of side cover 87 below the front end of hole 87b. Priority valve 128 includes a cylindrical member 128j, a plug 128k and a spring 128m. Cylindrical member 128j is fore-and-aft slidably fitted in valve hole 87e to cross vertical hole 87d. Cylindrical member 128j is formed with a partition wall 128h at a fore-and-aft intermediate inner portion thereof so as to divide the inner space of cylindrical member 128j between front and rear fluid chambers. Cylindrical member 128j crosses vertical hole 87d at the rear fluid chamber thereof. Plug 128k plugs the open front end of valve hole 87e, and spring 128m is disposed in valve hole 87e and in the front fluid chamber of cylindrical member 128j so as to be interposed between plug 128k and partition wall 128h of cylindrical member 128j. Partition wall 128h is formed therethrough with orifice 128c through which the front and rear chambers in cylindrical member 128j are fluidly connected to each other.

Cylindrical member 128j is formed with radial holes 128e open to the rear fluid chamber of cylindrical member 128j. Radial holes 128e are constantly open to vertical hole 87d at the outer peripheral surface of cylindrical member 128j so as to supply the rear fluid chamber of cylindrical member 128j with fluid from line filter 127 via holes 87c and 87d serving as fluid passage 122 regardless of the fore-and-aft slide of cylindrical member 128j. As the pressure of fluid in the rear fluid chamber of cylindrical member 128j is increased, this fluid pushes partition wall 128h forward against spring 128m, so that cylindrical member 128j gradually slides forward against spring 128m, and meanwhile a part of fluid in the rear fluid chamber of cylindrical member 128j leaks into the front fluid chamber of cylindrical member 128j via orifice 128c.

As shown in FIG. 8, valve hole 87c is formed with front and rear diametrically expanded portions that are disposed around cylindrical member 128j of priority valve 128 so as to serve as outlet ports 128a and 128b of priority valve 128. The front diametrically expanded portion of valve hole 87e is disposed forward from the junction with vertical hole 87d so as to serve as outlet port 128a. The rear diametrically expanded portion of valve hole 8'7e is disposed rearward from the junction with vertical hole 87d so as to serve as outlet port 128b. Side cover 87 is formed therein with front and rear vertical holes 87f and 87g. Vertical hole 87f is extended downward from outlet port 128a. Vertical hole 87g is extended downward from outlet port 128b.

Cylindrical member 128j is formed with radial holes 128f corresponding to outlet port 128a. Radial holes 128f are open to the front fluid chamber of cylindrical member 128j forward from radial holes 128e. Radial holes 128f are constantly open to outlet port 128a at the outer peripheral surface of cylindrical member 128j so as to deliver fluid from the front fluid chamber of cylindrical member 128j via outlet port 128a to vertical hole 87f (connected to clutch control valve 129 as discussed later) regardless of the fore-and-aft slide of cylindrical member 128j.

Cylindrical member 128j is formed with radial holes 128g corresponding to outlet port 128b. Radial holes 128g are open to the rear fluid chamber of cylindrical member 128j rearward from radial holes 128e. Open ends of radial holes 128g at the outer peripheral surface of cylindrical member 128j are disposed rearward from outlet port 128b so as to be shut off from outlet port 128b when cylindrical member 128j is disposed at the rearmost slide position. In this state, the leak of fluid from the rear fluid chamber to the front fluid chamber via orifice 128c for supplying fluid to vertical hole 87f (connected to clutch control valve 129 as discussed later) via radial holes 128f and outlet port 128a overrides the supply of fluid from the rear fluid chamber of cylindrical member 128j to vertical hole 87g (connected to the closed fluid circuit of HST 4 as discussed later) via radial holes 128g and outlet port 128b. As cylindrical member 128j slides forward by the increase of pressure of fluid in the rear fluid chamber of cylindrical member 128j, the opening degree of radial holes 128g to outlet port 128b is gradually increased so as to gradually increase the fluid supply to vertical hole 87g via radial holes 128g and outlet port 128b.

As shown in FIGS. 6 and 8, side cover 87 is formed therein with a lateral horizontal valve hole 87h crossing vertical hole 87f. Clutch control valve 129 is fitted in valve hole 87h so as to cross vertical hole 87f. Therefore, vertical hole 87f has an upper portion above clutch control valve 129, and a lower portion below clutch control valve 129. Relief valve 131 is inserted upward into the open bottom end of valve hole 87f so as to be fitted in the lower portion of vertical hole 87f below clutch control valve 129. The upper portion of vertical hole 87f constitute fluid passage 123 of hydraulic circuit 112 shown in FIG. 10 as interposed between outlet port 128a of priority valve 128 and clutch control valve 129. The lower portion of vertical hole 87f constitutes fluid passage 125 of hydraulic circuit 112 shown in FIG. 10 for supplying relief valve 131 with surplus fluid from clutch control valve 129 and later-discussed accumulator 130.

As shown in FIGS. 5 and 8, side cover 87 is formed therein with a hole 87j. Hole 87j is extended forward from valve hole 87h and is bent rightward so as to be open at a right side surface of side cover 87. As shown in FIGS. 5, 6 and 7, a lateral horizontal hole 85g is formed in a front wall 85f of main box member 85. A left end of hole 85g is open at a left end surface of front wall 85f so as to be joined to the end of hole 87j open at the right end surface of side cover 87. A right end portion of hole 85g is bent forward so as to be open at a front end surface of front wall 85f.

As shown in FIGS. 5, 6, 8 and 9, front cover 86 is formed in a leftward lower portion thereof with a lateral horizontal hole 86a. A left end of hole 86a is joined to the right end portion of hole 85g. As shown in FIGS. 6 and 9, front cover 86 is also formed with a fore-and-aft horizontal hole 86b joined to a right end of hole 86a. Hole 86b defines a front portion of accumulator 130 so that a vacant space in hole 86b is used for accumulating fluid. Further, referring to FIGS. 6, 7 and 9, a lower portion of support wall 85e is expanded downward from hydraulic clutch 84 so as to be formed with a forward open recess 85e4. A rear end portion of accumulator 130 is fitted into recess 85e4. Hole 87j in side cover 87, hole 85g in main box member 85 and hole 86a in front cover 86 constitute fluid passage 124 of hydraulic circuit 112 shown in FIG. 10 as interposed between clutch control valve 129 and accumulator 130.

As shown in FIGS. 5, 6 and 9, front cover 86 is also formed with a slant hole 86c extended upwardly rightward from the right end of hole 86a. Referring to FIGS. 5 and 9, a right end of hole 86c is open to an annular groove 45a formed on an outer peripheral surface of PTO shaft 45. PTO shaft 45 is formed therein with a fore-and-aft axial hole 45b. A radial hole is formed in PTO shaft 45 to connect axial hole 45b to annular groove 45a, and another radial hole 45c is formed in PTO shaft 45 so as to extend from axial hole 45b and so as to be open at an outer peripheral surface of PTO shaft 45 facing an inner peripheral surface of axial boss 102a of clutch casing 102. Axial boss 102a of clutch casing 102 is formed therein with a hole. This hole in axial boss 102a is open at the inner peripheral surface of axial boss 102a to radial hole 45c, and is open at the outer peripheral surface of axial boss 102a to clutch operating fluid chamber 106. In this way, holes 86a and 86c in front cover 86, annular groove 45a in PTO shaft 45, the radial hole in PTO shaft 45 extended from annular groove 45a, axial hole 45b in PTO shaft 45, radial hole 45c in PTO shaft 45 and the hole in axial boss 102a of clutch casing 102 constitute fluid passage 126 of hydraulic circuit 112 shown in FIG. 10 for supplying fluid from clutch control valve 129 to clutch operating fluid chamber 106 of PTO clutch 84.

As shown in FIGS. 5 and 8, side cover 87 is formed therein with a fore-and-aft horizontal hole 87k extended rearward from vertical hole 87g. As shown in FIG. 5, rear wall 85c of main box member 85 is formed therein with a lateral horizontal hole 85h. A rear end of hole 87k is bent rightward and is open at the right end surface of side cover 87 so as to be joined to a left end of hole 85h open at a left end surface of rear wall 85c of main box member 85. A right end of hole 85h is bent rearward and is open at a rear end surface of rear wall 85c of main box member 85. In this way, holes 87g and 87k in side cover 87 and hole 85h in main box member 85 constitute fluid passage 132 of hydraulic circuit 112 shown in FIG. 10 as formed in gearbox 16 so as to supply fluid from outlet port 128b of priority valve 128 to fluid passage 133 in hydraulic pump 10.

Referring to FIG. 5, a fore-and-aft horizontal hole 17a is formed through duct plate 17 of hydraulic pump 10 so as to be joined at a front end thereof to the right end of hole 85h open at the rear end surface of rear wall 85c of main box member 85 abutting against the front end surface of duct plate 17. A hole 18a is formed in a wall of pump housing 18 of hydraulic pump 10 so as to be joined at a front end thereof to a rear end of hole 17a open at the rear end surface of duct plate 17 abutting against the front end surface of pump housing 18. Hole 18a is extended in the wall of pump housing 18 so as to be connected to charge check and relief valves 135. In this way, hole 17a in duct plate 17 and hole 18a in the wall of pump housing 18 constitute fluid passage 133 of hydraulic circuit 112 shown in FIG. 10 as provided in hydraulic pump 10 for supplying fluid from fluid passage 132 to the closed fluid circuit of HST 4 including main fluid passages 34 and 35 via the opened charge check valve of one of charge check and relief valves 135.

Further, referring to FIG. 5, pump housing 18 and housing 41 are formed therein with holes (not detailed) that are extended from hole 18a so as to serve as fluid passage 134 of hydraulic circuit 112 shown in FIG. 10 as branching from fluid passage 133 to supply fluid to fluid supply port 138a of proportional solenoid valve 138. Pump housing 18 is formed therein with another hole (not shown) that is extended from hole 18a so as to serve as fluid passage 142 of hydraulic circuit 112 shown in FIG. 10 for supplying fluid to fluid supply port 141a of directional control valve 141.

Figure 11:
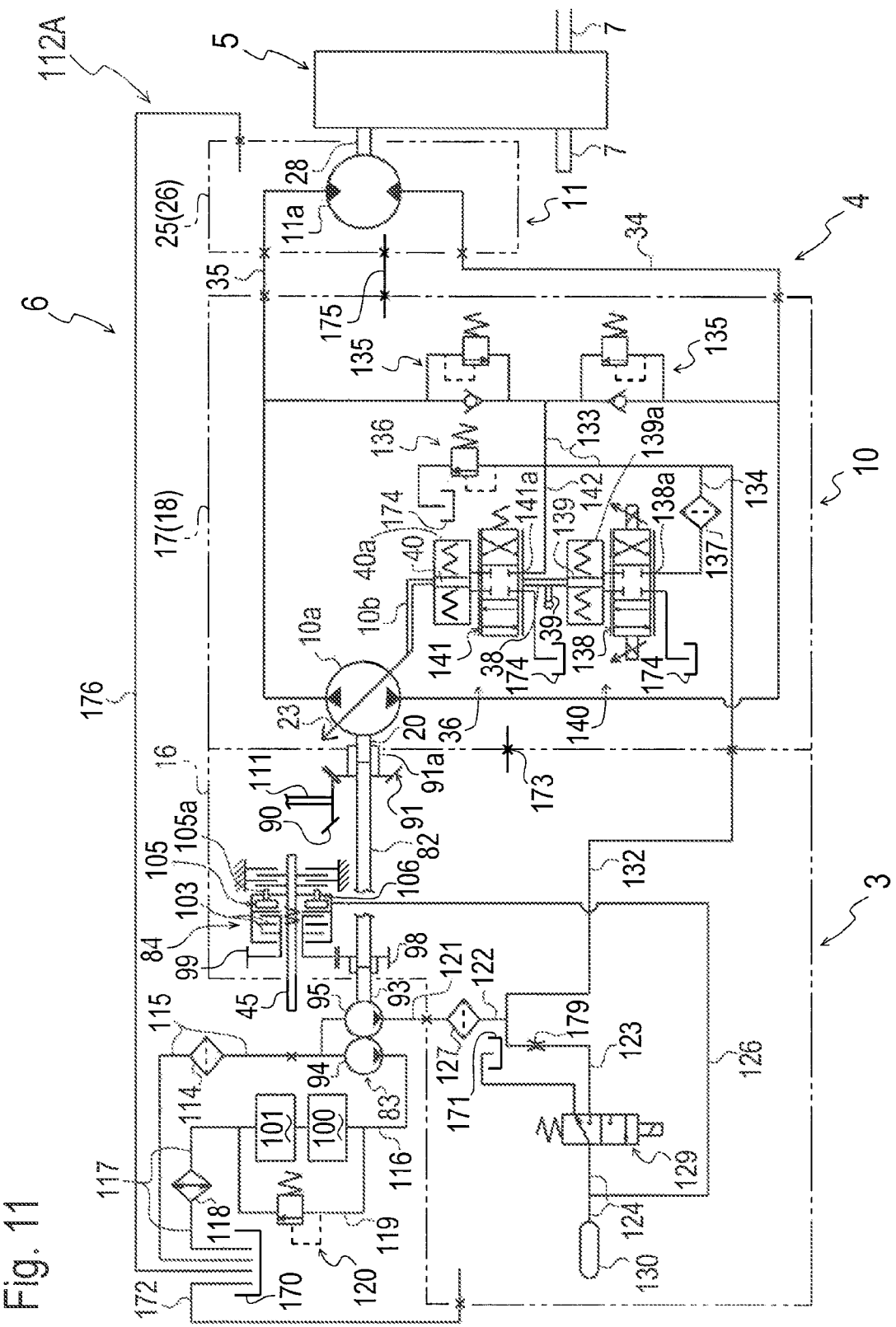
FIG. 11 is an alternative hydraulic circuit diagram for the powertrain system.

Referring to FIG. 11, an alternative hydraulic circuit 112A is the same as hydraulic circuit 112 expect that hydraulic circuit 112A is not provided with priority valve 128. In this regard, in hydraulic circuit 112A, fluid passage 122 is bifurcated into fluid passages 123 and 132 without priority valve 128, however, fluid passage 123 is provided thereon with an orifice 179 so as to reduce the flow of fluid to clutch control valve 129.

Referring to FIGS. 12 and 13, an alternative gear unit 3A includes auxiliary pump shaft 93 that is extended not coaxially but parallel to a pump drive shaft 82A having bevel gear 91 thereon, in comparison with gear unit 3 that includes auxiliary pump shaft 93 coaxial to pump drive shaft 82 as shown in FIGS. 5 and 6. This arrangement of auxiliary pump shaft 93 parallel to pump drive shaft 82A is advantageous to ensure a space for interposing a speed increasing gear train between shafts 93 and 82A so as to increase the rotary speed of auxiliary pump shaft 93 for driving hydraulic pumps 94 and 95.

To constitute the speed increasing gear train, gear unit 3A includes a transmission shaft 149 disposed in an alternative gearbox 16A above pump drive shaft 82A and parallel to pump drive shaft 82A. In this regard, an alternative front cover 86A is formed so as to journal a front end of pump drive shaft 82A and a front end of transmission shaft 149 via respective bearings and so as to have auxiliary pump unit 83 mounted thereon so that auxiliary pump shaft 93 is connected coaxially to transmission shaft 149. The front end of transmission shaft. 149 journalled by front cover 86A is formed with a forward open boss 149a. A rear end portion of auxiliary pump shaft 93 projects rearward from auxiliary pump unit 83 and is inserted into boss 149a through front cover 86A.

In spite of using alternative front cover 86A, main box member 85 and side cover 87 identical to those of gearbox 16 of gear unit 3 can be used to constitute gearbox 16A. Especially, as mentioned above, main box member 85 is formed with support wall 85e having recesses 85e1, 85e2, 85e3 and 85e4. Regardless of whether main box member 85 is used to make gearbox 16 for gear unit 3 or gearbox 16A for gear unit 3A, recess 85e1 is used to journal the rear end of PTO shaft 45, brake chamber 85e2 is used to accommodate PTO brake 107, and recess 85e4 is used to support the rear end of accumulator 130. Recess 85e3 is not used when main gearbox member 85 constitute gearbox 16, however, is used to journal the rear end of transmission shaft 149 via a bearing fitted therein when main box member 85 constitute gearbox 16A. Therefore, main box member 85 and side cover 87 can be standardized for providing different gear units 3 and 3A, thereby reducing costs for their manufacturing, inventory control and maintenance.

In gearbox 16A, a spur gear 98A is fixed (or formed) on pump drive shaft 82A so as to mesh with gear 99 for transmitting power to PTO shaft 45 via PTO clutch 84, similar to gear 98 on pump drive shaft 82 in gearbox 16. In gearbox 16A, a spur gear 150 that is diametrically smaller than spur gear 98A is fixed (or formed) on transmission shaft 149, and gear 98A also meshes with gear 150 so that gears 98A and 150 constitute the speed increasing gear train for rotating auxiliary pump shaft 93 faster than transmission shaft 149. Therefore, pump drive shaft 82A receives power from engine output shaft 12 vi flywheel 14, transmission shaft 111 and bevel gears 90 and 91, and pump shaft 93 receives power from pump drive shaft 82A via, the speed increasing gear train including spur gears 98A and 150 and transmission shaft 149 so as to drive hydraulic pumps 94 and 95 in pump unit 83.

The arrangement of gears 98A and 150 in gear unit 3A also means that the rotational direction of auxiliary pump shaft 93 in gear unit 3A is opposite the rotary direction of auxiliary pump shaft 93 in gear unit 3 on the assumption that the rotational direction of engine output shaft 12 is constant. Therefore, the selection of either gear unit 3 or gear unit 3A may rely on in which direction auxiliary pump shaft 93 of auxiliary pump unit 83 should be rotated relative to engine output shaft 12 as well as whether the speed increasing gear train should be provided for driving auxiliary pump shaft 93.

In comparison of front cover 86A of gearbox 16A as shown in FIG. 13 with front cover 86 of gearbox 16 as shown in FIG. 6, the position of front cover 86A relative to main box member 85 of gearbox 16A is the same as that of front cover 86 relative to main box member 85 of gearbox 16 because the position of front hole 85a to be covered by front cover 86 or 86A is constant, however, auxiliary pump unit 83 on front cover 86A coaxial to transmission shaft 149 above pump drive shaft 82A is higher than auxiliary pump unit 83 on front cover 86 coaxial to pump drive shaft 82. Therefore, on the assumption that the position of hole 87b in side cover 87 and connection pipe 148 joined to hole 87b is kept constant, gear unit 3A employs a short fluid delivery pipe 146A extended laterally horizontally rightward from charge pump 95 of auxiliary pump unit 83 on front cover 86A to connection pipe 148, in comparison with gear unit 3 that employs long fluid delivery pipe 146 extended slantwise upward from charge pump 95 of auxiliary gear unit 83 on front cover 86 to connection pipe 148. In other words, long fluid delivery pipe 146 and short fluid delivery pipe 146A can be easily exchanged for each other so as to correspond to whether gear unit 3 or gear unit 3A is selected.

Figure 14:
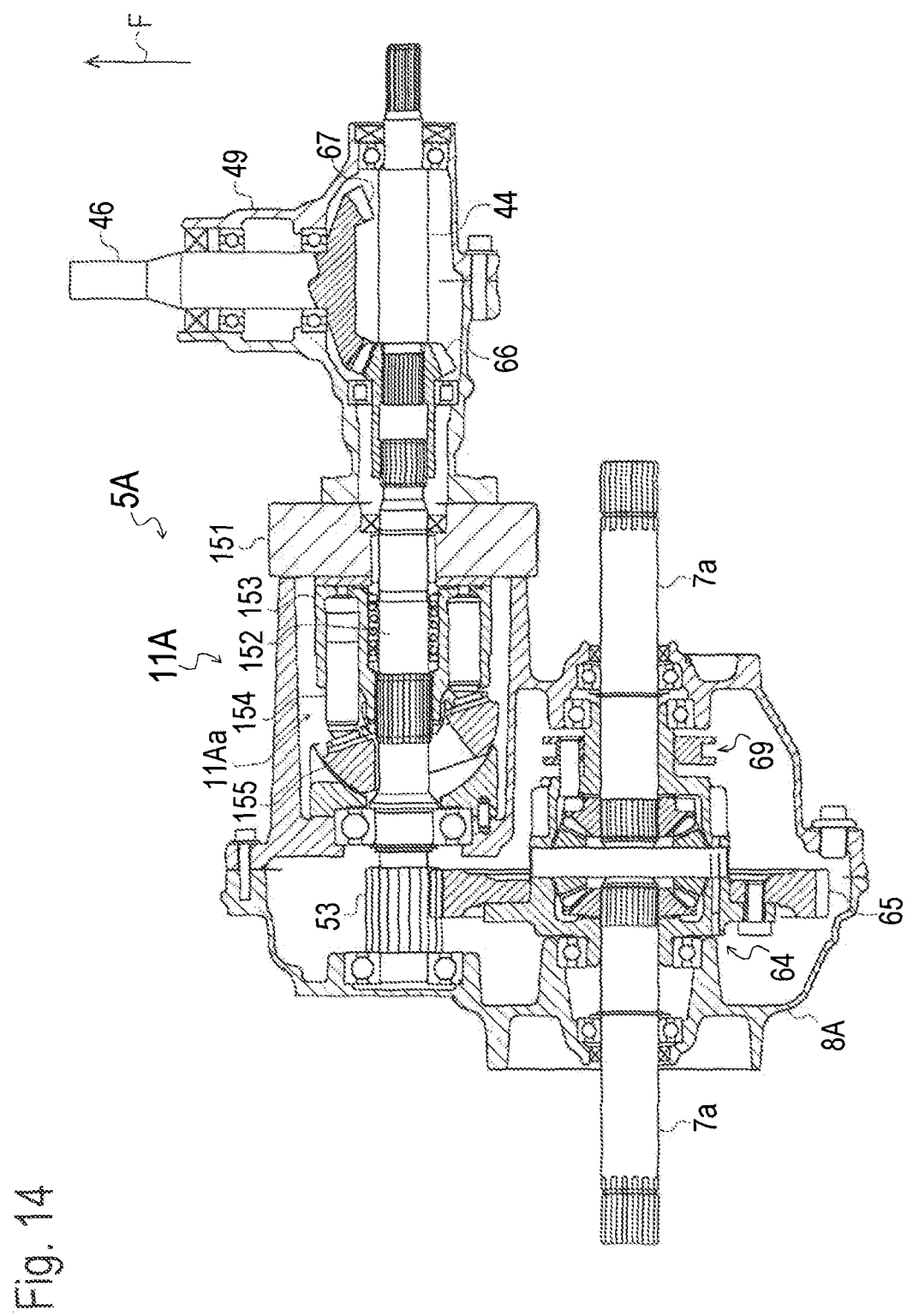
FIG. 14 is a sectional plan view of an alternative transaxle.

Referring to FIG. 14, an alternative transaxle 5A is the same as transaxle 5 except that transaxle 5A includes an alternative transaxle housing 8A incorporating an alternative variable displacement hydraulic motor 11A in place of sub speed-change gear transmission 50. Hydraulic motor 11A includes a duct plate 151, a motor shaft 152 and a main motor assembly 11Aa. Duct plate 151 is fixed to a right or left (in this embodiment, right) end of transaxle housing 8A so as to serve as a spacer interposed between transaxle housing 8A and PTO housing 49. Lateral horizontal motor shaft 152 is journalled by duct plate 151. In PTO housing 49, a right end portion of motor shaft 152 is fitted into bevel gear 66. In transaxle housing 8A, a cylinder block 153 is fixed on motor shaft 152, axial plungers 154 are reciprocally slidably fitted in cylinder block 152, and a movable swash plate 155 is disposed to abut against heads of plungers 154 so as to be shiftable between a small tilt angle position for high speed driving of motor shaft 152 and a large tilt angle position for low speed driving of motor shaft 152. Main motor assembly 11Aa includes cylinder block 153, plungers 154 and movable swash plate 155. Final pinion 53 is fixed on motor shaft 152 leftward from main pump assembly 11Aa so as to mesh with input gear 65 of differential gear unit 64 in transaxle housing 8A.

Similar to ducts in duct plate 25 of hydraulic motor 11 of transaxle 5, ducts formed in duct plate 151 of hydraulic motor 11A of transaxle 5A are fluidly connected via pipes to the ducts in duct plate 17 of hydraulic pump 10 of gear unit 3 or 3A, thereby constituting the closed fluid circuit of the HST including main fluid passages 34 and 35 and hydraulic pump 10 and motor 11A. Hydraulic motor 11A is driven by fluid delivered from hydraulic pump 10 so as to transmits its output power to drive wheels 9 via differential gear unit 64 and to PTO shaft 46 (e.g., for driving other drive wheels of vehicle 1).

While movable swash plate 155 of hydraulic motor 11A ensures the high-low speed shift function equivalent to that of sub speed-change gear transmission 50, hydraulic motor 11A disposed in transaxle housing 8A of transaxle 5A advantageously contributes to minimization of transaxle 5A in comparison with transaxle 5 which has hydraulic motor 5 outside of transaxle housing 8 incorporating sub speed-change gear transmission 50.

Figure 15:
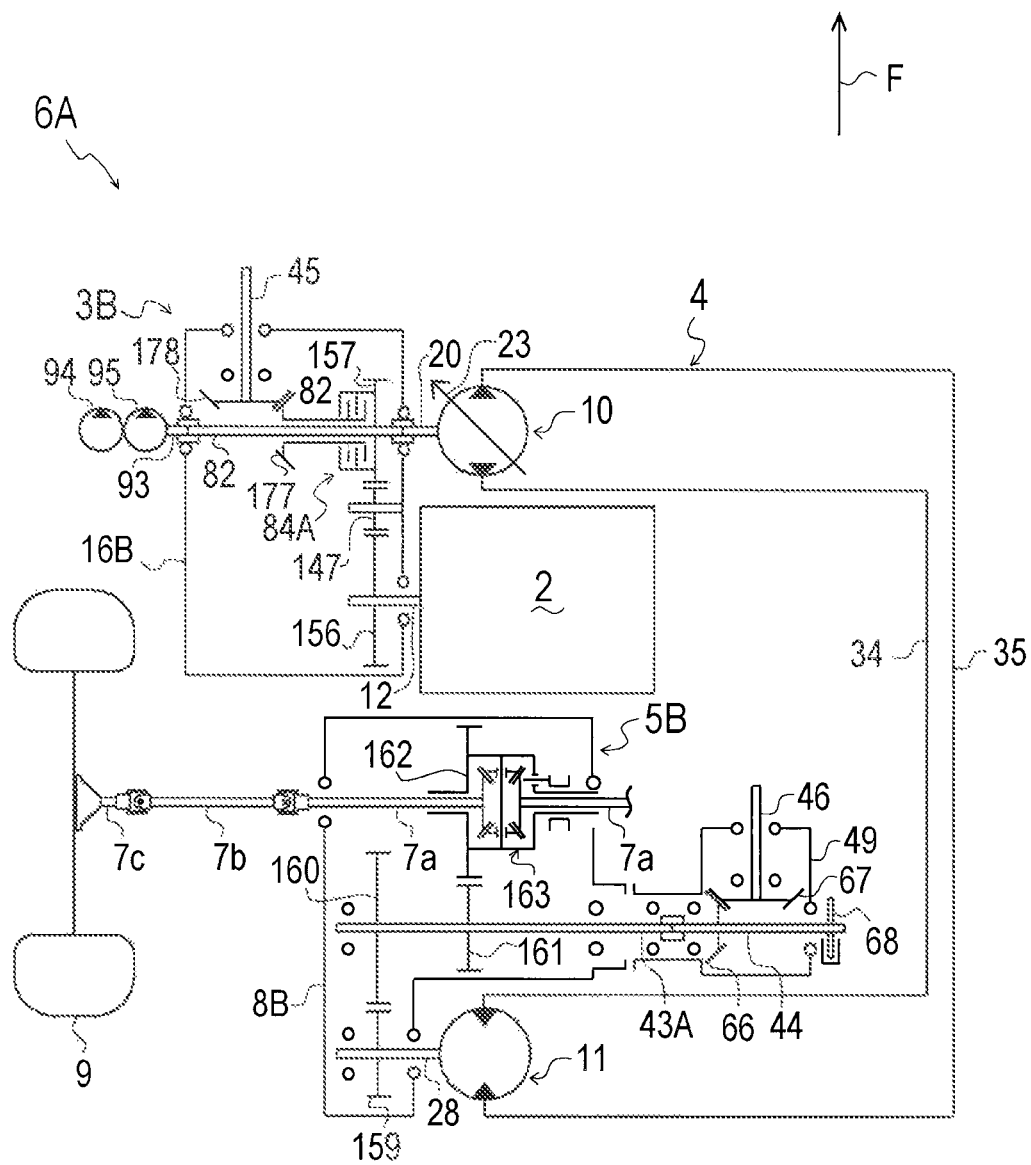
FIG. 15 is a skeleton diagram of an alternative powertrain system for a vehicle.

Referring to FIG. 15, an alternative powertrain system 6A includes an alternative gear unit 3B having a gearbox 16B from which both engine 2 and hydraulic pump 10 are disposed rightward, and includes an alternative transaxle 5B that has a transaxle housing 8B having a rear portion from which hydraulic motor 11 is disposed rightward. Powertrain system 6A is advantageous in that a space around engine 2 can be used to facilitate the piping between hydraulic pump 10 and hydraulic motor 11 for constituting HST 4, and in that transaxle 5B approaches engine 2 so as to reduce a space for arranging powertrain system 6A.

In gear unit 3B, hydraulic pump 10 mounted on a right outside of gearbox 16B is disposed forward from engine 2, so that pump shaft 20 of hydraulic pump 10 is disposed forward from engine output shaft 12 and is laterally horizontally extended parallel to engine output shaft 12. In gearbox 16B, pump drive shaft 82 is extended laterally horizontally so as to be connected at a right end thereof coaxially to pump shaft 20. In gearbox 16B, a spur gear 156 is fixed on engine output shaft 12, a spur gear 157 is fixed on pump drive shaft 82, and gears 156 and 157 mesh with each other via an idle gear 147 so that gears 156 and 157 rotate in the same direction. Auxiliary pump unit 83 including hydraulic pumps 94 and 95 is mounted on a left outside of gearbox 16B, so that auxiliary pump shaft 93 of auxiliary pump unit 83 is connected coaxially to a left end of pump drive shaft 82.

PTO shaft 45 projects forward from gearbox 16B. In gearbox 16B, a bevel gear 178 is fixed on a rear end of PTO shaft 45, a bevel gear 177 is fitted on pump drive shaft 82 rotatably relative to pump drive shaft 82 and meshes with bevel gear 178, and a PTO clutch 84A is provided on pump drive shaft 82 so as to be interposed between pump drive shaft 82 and bevel gear 177.

The above-mentioned arrangement of hydraulic pump 10 forward from engine 2 is advantageous to arrange a front end of transaxle housing 8B adjacent to a rear end of engine 2 so that transaxle 5B is disposed adjacently rearward from engine 2. PTO housing 49 supporting PTO shaft 46 is mounted rightward on transaxle housing 8B of transaxle 5B, and hydraulic pump 11 mounted rightward on the rear portion of transaxle housing 8B as mentioned above is disposed rearward from PTO housing 49. Pipes serving as main fluid passages 34 and 35 are interposed between hydraulic pump 10 and hydraulic motor 11 so as to constitute HST 4. These pipes can be passed through a free space rightward from engine 2, thereby being simplified and shortened.

In transaxle housing 8B, motor shaft 28 of hydraulic motor 11 is extended laterally horizontally, a lateral horizontal counter shaft 48A is disposed forward from motor shaft 28 and is extended parallel to motor shaft 28, and a differential gear unit 163 supporting right and left coaxial differential output shafts 7a is disposed forward from counter shaft 48A so that right and left differential output shafts 7a are laterally horizontally extended parallel to counter shaft 48A. In transaxle housing 8B, a gear 159 is fixed on motor shaft 28, a gear 160 is fixed on counter shaft 43A and meshes with gear 159, a gear 161 is fixed on counter shaft 43A and meshes with an input gear 162 of differential gear unit 163, thereby constituting a reduction gear train for transmitting power from motor shaft 28 to differential gear unit 163. Further, in PTO housing 49, transmission shaft 44 is connected coaxially to counter shaft 43A and is drivingly connected to PTO shaft 46 via gears 66 and 67 so as to transmit power from motor shaft 28 to PTO shaft 46.

It is further understood by those skilled in the art that the foregoing description is given of preferred embodiments of the disclosed apparatus and that various changes and modifications may be made in the invention without departing from the scope thereof defined by the following claims.

What is claimed is:

1. A powertrain system for a vehicle, comprising:
an engine including an engine output shaft extended in a lateral direction of the vehicle;
a transaxle including a hydraulic motor;
a hydraulic pump separated from the hydraulic motor, wherein the hydraulic pump and the hydraulic motor are fluidly connected to each other so as to constitute a hydrostatic transmission ("HST");
a gearbox joined to the hydraulic pump, and supporting a power take off ("PTO") shaft, wherein the gearbox incorporates gears for drivingly connecting the engine output shaft to the hydraulic pump, and for drivingly connecting the engine output shaft to the PTO shaft extended in a fore-and-aft direction of the vehicle, and wherein the gearbox includes an opening and a cover covering the opening;
a hydraulic PTO clutch disposed in the gearbox so as to be interposed between the engine output shaft and the PTO shaft, wherein the cover is formed therein with a fluid passage fluidly connected to the PTO clutch; and
a control valve for hydraulically controlling the PTO clutch, wherein the control valve is mounted to the cover and is fluidly connected to the fluid passage in the cover.

2. The powertrain system according to claim 1, wherein an accumulator for fluid supplied to the PTO clutch is disposed in the gearbox.

3. The powertrain system according to claim 1, further comprising:
a charge pump for supplying fluid to the HST, wherein a drive shaft for driving the charge pump is extended coaxially to a pump shaft of the hydraulic pump of the HST extended perpendicular to the engine output shaft.

4. The powertrain system according to claim 3, wherein the charge pump also supplies fluid to the PTO clutch via the fluid passage in the cover and the control valve.

5. The powertrain system according to claim 1, wherein the cover is disposed at a portion of the gearbox opposite the engine in the lateral direction of the vehicle.

6. A powertrain system for a vehicle, comprising:
an engine including an engine output shaft extended in a lateral direction of the vehicle;
a transaxle including a hydraulic motor;
a hydraulic pump separated from the hydraulic motor, wherein the hydraulic pump and the hydraulic motor are fluidly connected to each other so as to constitute a hydrostatic transmission ("HST");
a gearbox joined to the hydraulic pump, and supporting a power take off ("PTO") shaft, wherein the gearbox incorporates gears for drivingly connecting the engine output shaft to the hydraulic pump, and for drivingly connecting the engine output shaft to the PTO shaft extended in a fore-and-aft direction of the vehicle; and
a hydraulic PTO clutch disposed in the gearbox so as to be interposed between the engine output shaft and the PTO shaft, wherein an accumulator for fluid supplied to the PTO clutch is disposed in the gearbox.

* * * * *